(12) United States Patent
Carroll

(10) Patent No.: US 7,312,981 B2
(45) Date of Patent: Dec. 25, 2007

(54) MOBILE, HAND-HELD PERSONAL COMPUTER

(76) Inventor: David W. Carroll, 2817 Anthony Lake South, Minneapolis, MN (US) 44418

( * ) Notice: Subject to any disclaimer, the term of this patent is extended or adjusted under 35 U.S.C. 154(b) by 191 days.

(21) Appl. No.: 10/999,168

(22) Filed: Nov. 29, 2004

(65) Prior Publication Data

US 2005/0135053 A1 Jun. 23, 2005

Related U.S. Application Data

(63) Continuation-in-part of application No. 10/826,924, filed on Apr. 16, 2004, now abandoned.

(60) Provisional application No. 60/564,631, filed on Apr. 21, 2004, provisional application No. 60/564,632, filed on Apr. 21, 2004, provisional application No. 60/463,453, filed on Apr. 16, 2003.

(51) Int. Cl.
*G06F 1/16* (2006.01)
*H04B 1/38* (2006.01)

(52) U.S. Cl. ................. 361/683; 455/566; 345/169

(58) Field of Classification Search ........... 345/169, 345/156–173; 455/566, 90, 575; 361/679–687, 361/724–727
See application file for complete search history.

(56) References Cited

U.S. PATENT DOCUMENTS

| 7,068,258 B2* | 6/2006 | Cone et al. ............... 345/169 |
| 2001/0034250 A1* | 10/2001 | Chadha ................. 455/566 |
| 2006/0098403 A1* | 5/2006 | Smith ................... 361/683 |

* cited by examiner

*Primary Examiner*—Hung Van Duong
(74) *Attorney, Agent, or Firm*—Dicke, Billig, Czaja, PLLC

(57) ABSTRACT

A mobile personal computer including a case, a micro-display system, a speech recognition system, a microprocessor, and a power source. The case is sized for handling by a single, adult human hand. The micro-display system is maintained by the case and includes a screen viewable at a first face of the case. The speech recognition system is also maintained by the case and includes a microphone positioned at the first face of the case for collecting sound waves generated by a user's speech. The microprocessor is maintained within the case and is electronically connected to the micro-display system and the speech recognition system. Further, the microprocessor utilizes a personal computer operating system to perform computing operations. Finally, the power source is maintained within the case. With this configuration, the mobile personal computer is easily handled and operated with a single hand.

22 Claims, 17 Drawing Sheets

A-A

OPT. A-A

MOBILE, HAND-HELD PERSONAL COMPUTER

CROSS-REFERENCE TO RELATED APPLICATIONS

This is a Continuation-In-Part of U.S. patent application Ser. No. 10/826,924, filed Apr. 16, 2004 now abandoned, and entitled "Mobile Computing Devices", that claims priority to U.S. Provisional Patent Application No. 60/463,453, filed Apr. 16, 2003, the entirety of each of which is incorporated herein by reference, and claims benefit under 35 U.S.C. § 119(e) to both U.S. Provisional Patent Application No. 60/564,631, filed Apr. 21, 2004 and U.S. Provisional Patent Application No. 60/564,632, filed Apr. 21, 2004.

BACKGROUND OF THE INVENTION

The present invention relates to a hand-held personal computer. More particularly, it relates to a mobile, hand-held personal computer having a viewer and speech recognition capabilities. Alternative embodiments incorporate features that enhance functionality.

Personal computers are virtually commonplace in today's society. Continued advancements in the technology and manufacturing of various components associated with the personal computer (e.g., processor, memory, display, etc.) have greatly enhanced the operational capabilities of personal computers. For example, while desktop personal computers continue to be widely used, component technology advancements in combination with development of viable battery power sources has resulted in highly popular laptop personal computers. The transition of consumer preference from desktop personal computers to laptop personal computers is a reflection of an overall demand for portable or mobile electronic devices. That is to say, consumers desire the ability to conveniently transport and use their personal computers at various locations.

While laptop computers represent a marked improvement, in terms of mobility, over conventional desktop personal computers, certain consumer desires remain unfulfilled. For example, a laptop computer is not truly mobile in that a work surface is required, and the user must employ two hands to operate the laptop personal computer. Further, while flat panel displays used by most laptop personal computers are increasingly able to generate high quality images, a relatively significant amount of power is required, thus limiting the amount of time the laptop personal computer can be operated before re-charging of the battery power source is required.

Other electronic devices have been developed that are smaller in size as compared to a conventional laptop personal computer and thus are inherently more mobile or portable. For example, personal digital assistants (PDA), digital cameras, and mobile phones are widely available. However, these, and other electronic devices, are capable of performing only a single, dedicated function, and do not provide and cannot implement a personal computer operating system. That is to say, available electronic devices held and operated with one hand are not personal computers. Further, most, if not all, of the available portable personal computer devices continue to require both hands of the user and a surface or pen tablet input format to operate.

In light of the above-described consumer preference, attempts have been made to develop a more portable personal computer (as compared to a laptop personal computer), such as a user-wearable personal computer. While laudable, these efforts have not fully addressed the importance of facilitating single-handed operation of the personal computer. In many instances, this single-handed operation attribute is essential, such as with language translation systems usable in environments requiring heightened mobility, such as military situations. For these and other applications, the mobile computing device requires not only a view or display screen, but also an acoustical system for collecting and analyzing words and/or sounds uttered by the user. The prevailing approach to address the requirements of these and similar applications is to connect a separate microphone to the personal computer case via a wire, with the user then being required to separately secure or otherwise hold both the microphone and the personal computer case. While viable, this approach falls well short of the ease of handling characteristic desired, if not required, by most users.

Further, the various application capabilities provided with laptop computers or other contemplated portable personal computers are all stored on a memory device (e.g., memory chip) that is essentially permanently affixed within the personal computer's case. Similarly, other core components and convergence of devices may require replacement or upgrading over time (e.g., printed circuit board, bus connectors, hard drive, wireless connection/protocol, transceiver, camera, etc.) Thus, when certain applications or hardware becomes outdated, and/or upgrades become available, the consumer is faced with the difficult task of attempting to remove the old version from the memory and install the newer version. More likely, the user simply discards the personal computer altogether, including all components thereof that would otherwise continue to be useful, and purchases a new personal computer. Obviously, this raises economic and environmental concerns.

Users in mobile activities use computing devices differently than at a work station. They use the computing devices more times for shorter periods, and have difficulties using both hands for input to select applications, keying letters/numbers/punctuation, and moving through software steps or processes. They further find multiple or wired devices problematic for orienting, mounting and storage. In light of the above, a need exists for a mobile personal computer capable of single-handed handling and operation, capable of performing a variety of computing operations.

SUMMARY OF THE INVENTION

One aspect of the present invention relates to a mobile personal computer including a case, a micro-display system, a speech recognition system, a microprocessor, and a power source. The case is sized for handling by a single, adult human hand. The micro-display system is maintained by the case and includes a screen viewable at a first face of the case. The speech recognition system is also maintained by the case and includes a microphone positioned at the first face of the case for collecting sound waves generated by a user's speech. The microprocessor is maintained within the case and is electronically connected to the micro-display system and the speech recognition system. Further, the microprocessor utilizes a personal computer operating system to perform computing operations. Finally, the power source is maintained within the case. With this configuration, the mobile personal computer is easily handled and operated with a single hand. The speech recognition system affords a user the ability to perform voice-related operations, such as language translation, as well as to, in alternative embodiments, control operative features of the computer, such as displaying desired content on the screen.

In alternative embodiments, the screen and the microphone are optimally positioned such that a user's mouth is located in close proximity to the microphone while the screen is being viewed by an eye of the user. In other alternative embodiments, two or more sub-system modules are separately and removably secured within the case and electronically coupled to the microprocessor. With this configuration, sub-system modules can easily be swapped in manner heretofore unavailable with a hand-held electronic device. To this end, and in other embodiments, the case includes a drawer slidably maintained within a housing, with the drawer configured to facilitate loading of sub-system modules and/or other personal computer components. In other embodiments, the personal computer includes a motion sensor, with the microprocessor adapted to implement a desired operational mode when the motion sensor detects movement of the personal computer. In other embodiments, the mobile personal computer includes one or more touch pads conveniently located for interface by finger(s) and/or thumb of a user's hand otherwise grasping the case. The mobile personal computer can alter the operational activity or purpose of the touch pad(s) upon a variety of input (e.g., rotational orientation of the computer, user-entered input at the touch pad in question, orientation of the computer relative to the user (e.g., being held/used as a telephone or as a camera, etc.). In other embodiments, the mobile personal computer includes one or more additional, auxiliary features such as a telephone, camera, bar code recorder, etc.

BRIEF DESCRIPTION OF THE DRAWINGS

Embodiments of the invention will be described with respect to the figures, in which like reference numerals denote like elements, and in which.

DETAILED DESCRIPTION

Figure 1A:
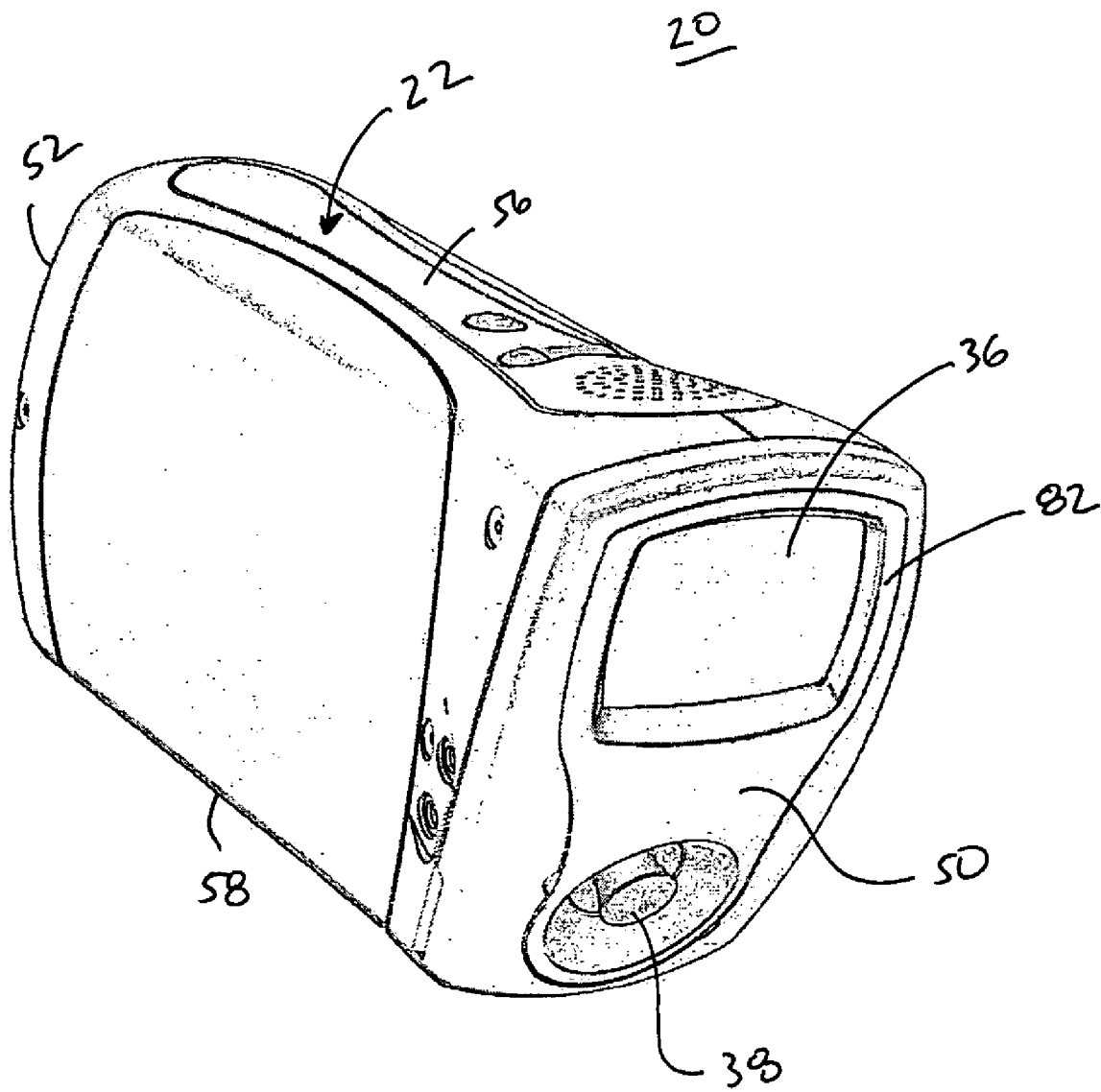
FIG. 1A is a perspective view of a mobile personal computer in accordance with the present invention.
Figure 1B:
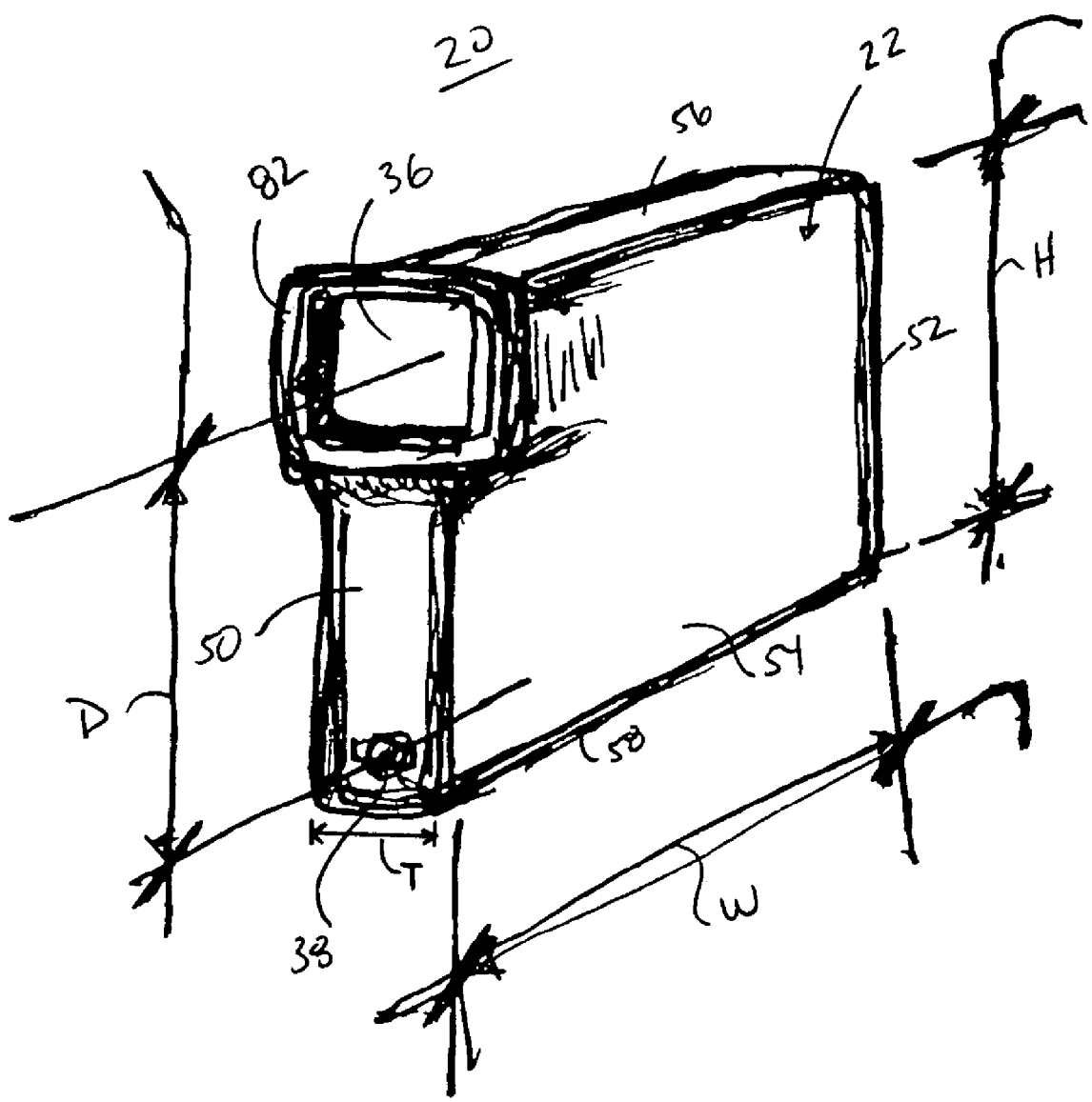
FIG. 1B is a simplified illustration of the mobile personal computer of FIG. 1A illustrating dimensional features.
Figure 2:
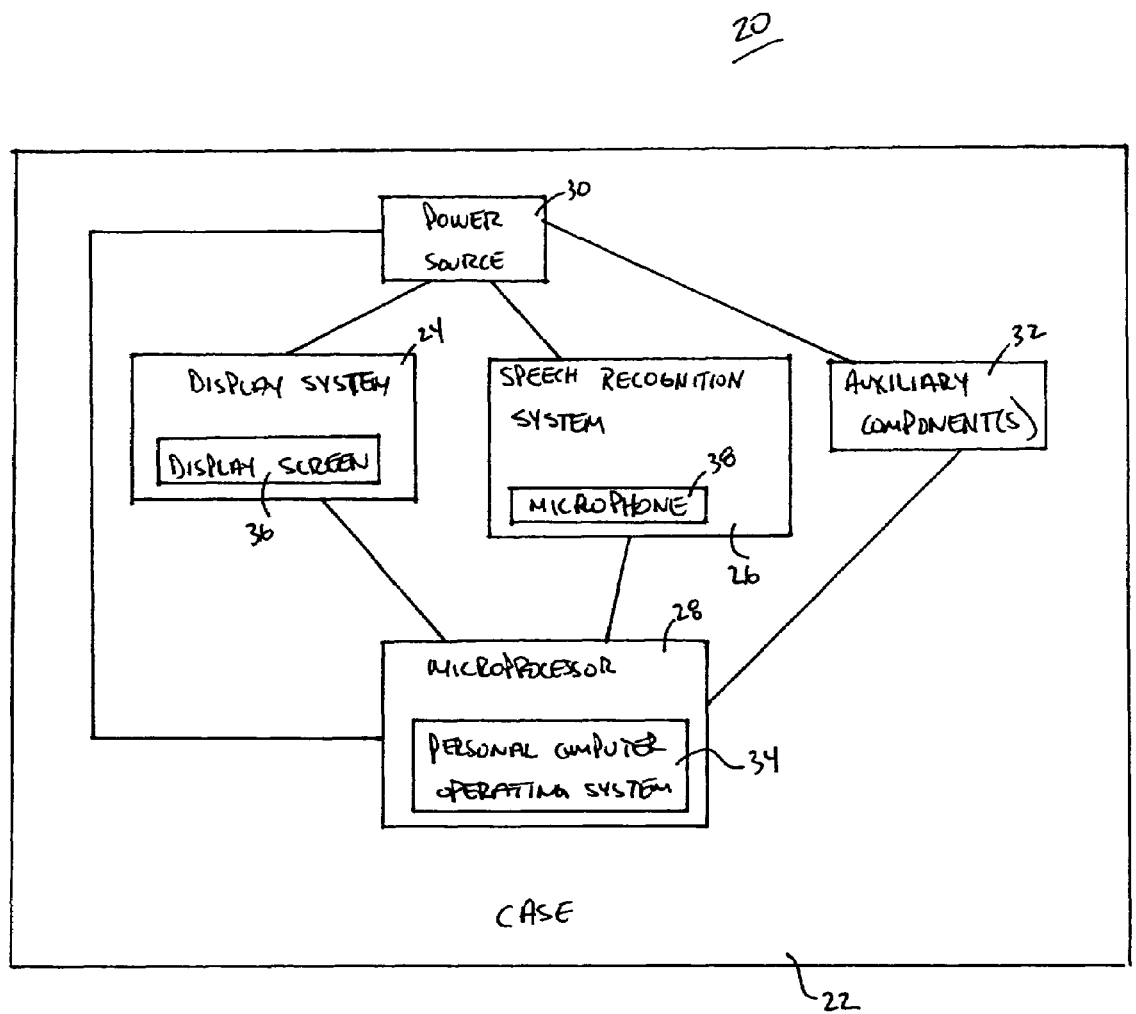
FIG. 2 is a block diagram of the mobile personal computer of FIG. 1.

One embodiment of a mobile personal computer 20 in accordance with the present invention is shown in perspective in FIGS. 1A and 1B, and in the block diagram of FIG. 2. As a point of reference, FIG. 1B is a simplified version of FIG. 1A, and is provided to better illustrate dimensional features in accordance with one embodiment. The mobile personal computer 20 includes a case 22, a micro-display system 24 (hereinafter referred to as "display system"), a speech recognition system 26, a microprocessor 28, and a power source 30. In alternative embodiments, the mobile personal computer 20 includes one or more auxiliary components 32 as described below. Regardless, the components 24-32 are maintained by the case 22, with the microprocessor 28 performing computing operations and controlling function of the display system 24, the speech recognition system 26, and the auxiliary component(s) 32. In this regard, the microprocessor 28 utilizes a personal computer operating system 34. Further, the display system 24 includes a micro-display screen (or "display screen") 36, whereas the speech recognition system 26 includes a microphone 38. Details on the various components are described below. In general terms, however, the case 22 is sized to be held by a single hand, with the microprocessor 28 rendering the mobile personal computer 20 essentially identical in a computing sense to "standard" personal computers (e.g., desktop or laptop). The display system 24 and the speech recognition system 26 are connected to and controlled by the microprocessor 28 and provide highly convenient user interfaces with the mobile personal computer 20. Thus, the mobile personal computer 20 is a viewer/speech based mobile personal computer. In one embodiment, the mobile personal computer 20 is adapted to perform language translation operations, although a wide variety of other computing operations are equally applicable and may or may not be provided in place of or in addition to the language translation feature.

Various components of the mobile personal computer 20 can assume different forms, as known in the art. For example, the display system 24 can be any system (including appropriate hardware and software) capable of generating a display on a micro-screen (e.g., the display screen 36) requiring minimal power. As described below, the display system 24 can include one or more lenses and/or mirrors for augmenting images formed on the display screen 36. Exemplary display systems 24 include, for example, OLED microdisplays from eMagin Corporation of East Fishkill, N.Y. By employing the micro-screen or micro-display 36, overall device size and power consumption is greatly reduced as compared to conventional display systems (e.g., a flat panel display).

Similarly, the speech recognition system 26 can be any system (including appropriate hardware and software) capable of processing sounds received at one or more microphones, such as the microphone 38. The microphone 38 is preferably a noise canceling microphone as known in the art, although other designs are also acceptable. Programming necessary for performing speech recognition operations can be provided as part of the speech recognition system 26, as part of the processor 28, or both. Further, the speech recognition system 26 can be adapted to perform various speech recognition operations, such as speech translation either by software maintained by the system 26 or via a separate sub-system module (not shown). Exemplary speech recognition systems 26 include, for example, Dragon NaturallySpeaking® from ScanSoft, Inc., of Peabody, Mass., or Microsoft® speech recognition systems (beta).

The microprocessor 28 can also assume a variety of forms known or in the future created, including, for example, Intel® Centrino(™) and chips and chip sets (e.g., Efficeon(™)) from Transmeta Corp., of Santa Clara, Calif. In most basic form, however, the microprocessor 28 is capable of operating a personal computer operating system (e.g., Windows Operating System) that can be provided as part of the microprocessor 28 or via a separate component (not shown) electrically connected to the microprocessor 28. Finally, the power source 30 is, in one embodiment, a lithium-based, rechargeable battery such as a lithium battery, a lithium ion polymer battery, a lithium sulfur battery, etc. Alternatively, a number of other battery configurations are equally acceptable. Regardless, the power source 30 is capable of providing long-term power to the various components of the mobile personal computer 20.

Where provided, the auxiliary component(s) 32 can assume a number of different forms, several of which are described below. For example, the auxiliary component(s) 32 can include a wireless communication device, audio speaker(s), docking connection(s), camera(s), touch screen (s), touch pad(s), mouse/cursor controller(s), motion sensor, biometric device (e.g., voice of fingerprint identification device), etc., each or all of which are electronically connected to, and thus interface with, the microprocessor 28.

With the above-described, general parameters in mind, in one embodiment, the case 22 is configured in accordance with human form factors. For example, the case 22 can be described as an elongated body defining a first face 50, a second face 52 (referenced generally in FIG. 1), a first side 54, a second side (hidden in FIG. 1) opposite the first side 54, a top 56, and a bottom 58 (referenced generally in FIG. 1). As described in greater detail below, the display screen 36 is viewable via the first face 50, and the microphone 38 is disposed on the first face 50, in a manner conducive to single-handed operation. In addition, in one embodiment the case 22 has a height (i.e., dimension defined between the top 56 and the bottom 58) and width (i.e., dimension defined between the first face 50 and the second face 52) commensurate with the grip of a normal adult, human hand. For example, in one embodiment, the case 22 has a height ("H") in the range of 1.5-3 inches, more preferably in the range of 2-2.5 inches; a width ("W") in the range of 4.0-5.5 inches, more preferably 4.25-5.25 inches; and a nominal thickness ("T") in the range of 0.5-1.5 inches, more preferably 0.75-1.25 inches. With additional reference to FIG. 3A, these one preferred dimensional ranges allow the case 22 to be held in a hand 60 of a user 62 (illustrated generally) such that fingers 64 of the user's hand 60 extend over the top 56 of the case 22 and a thumb 66 can interface with the first face 50. As further shown in FIG. 3A, the mobile personal computer 20 can further include an optional strap 68 to assist in maintaining the case 22 within the grip of the user's hand 60. Alternatively, other dimensions for the height H, width W and/or thickness T can be employed as illustrated, for example, in other embodiments described herein. Further, the case 22 can assume other shapes in transverse cross-section (e.g., circle, triangle, etc.) that may not necessarily provide a uniform height, width, and/or thickness.

Figure 3A:
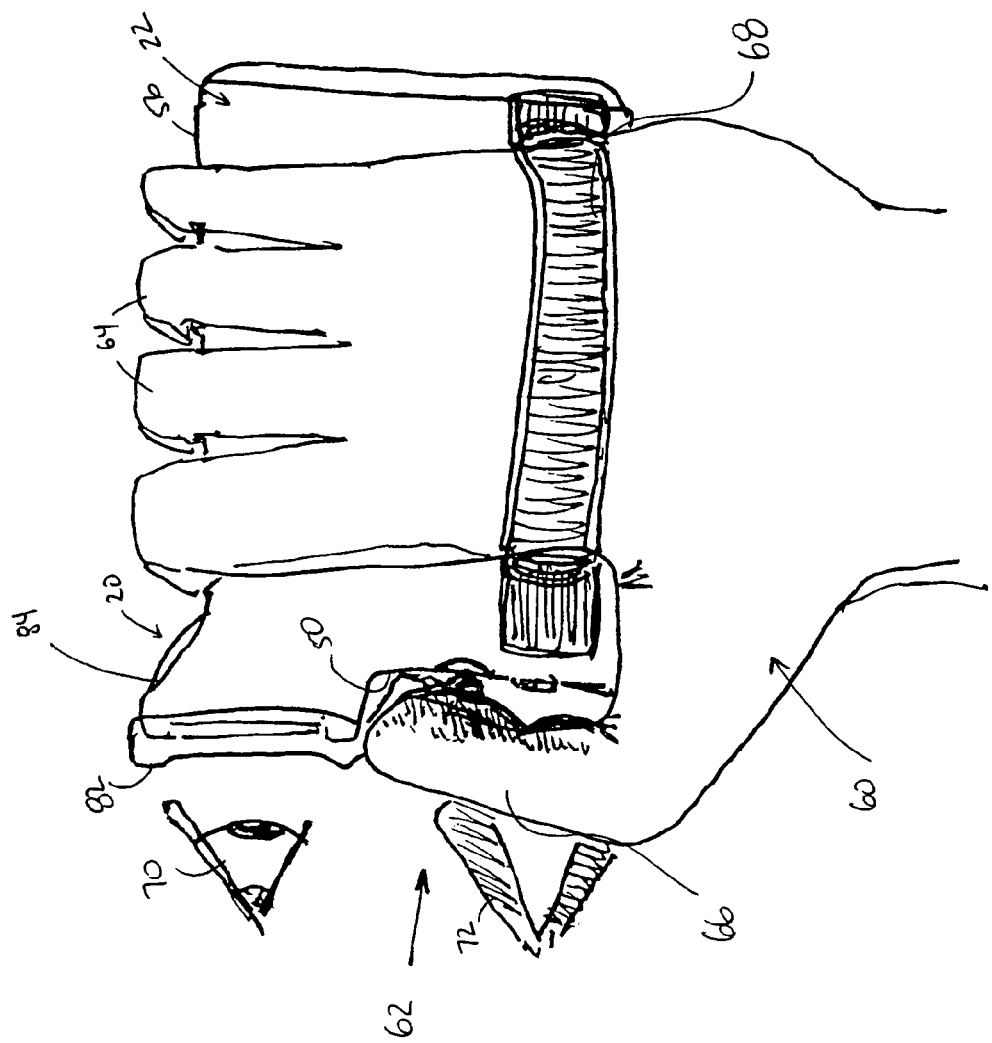
FIG. 3A is a schematic, side illustration of a user holding the mobile personal computer of FIG. 1.
Figure 3B:
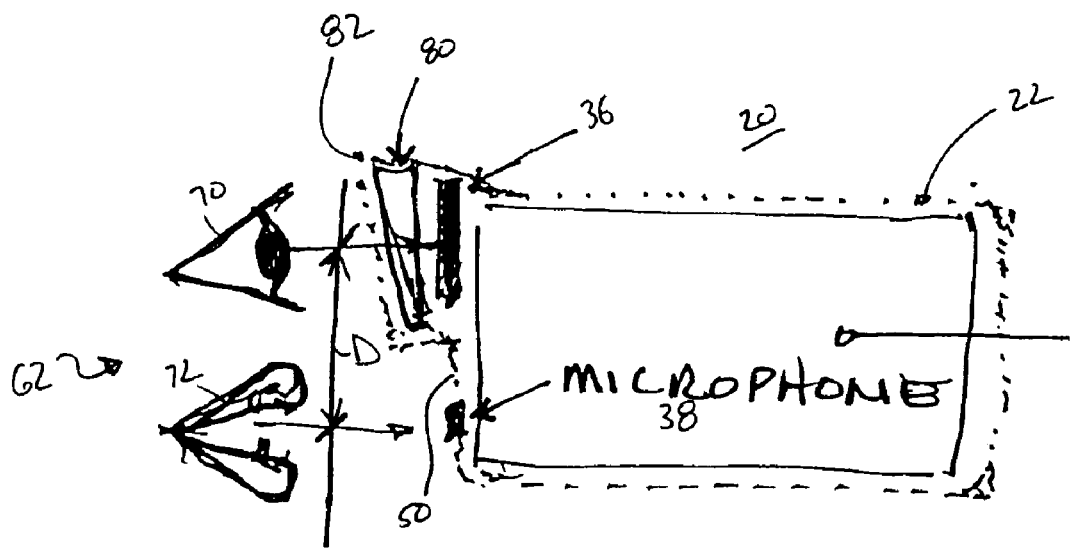
FIG. 3B is a schematic, partially cutaway view of the computer/user of FIG. 3A.

An additional human factor formatting feature provided by the case 22 in accordance with one embodiment of the present invention relates to the manner in which the display screen 36 and the microphone 38 are presented to the user 62 during normal use. With reference to FIGS. 3A and 3B (otherwise schematically illustrating an eye 70 and mouth 72 of the user 62 relative to the mobile personal computer 20), the case 22 is configured such that the first face 50 optimally locates the display screen 36 and the microphone 38 relative to the user 62 based upon adult human form factors associated with the eye 70/mouth 72. By way of reference, FIG. 3B illustrates the display system 24 (referenced generally) as including the display screen 36 and a lens 80 provided to augment (e.g., enlarge) images formed on the display screen 36 for viewing by the user 62. Regardless, the first face 50 defines a viewing region 82 (better identified in FIG. 1) through which the images generated on the display screen 36 can be viewed. In one embodiment, viewing region 82 is formed at the end of a neck 84 otherwise projecting outwardly relative to a remainder of the first face 50. In another embodiment, the viewing region 82 is surrounded by a foam pad (not shown) or similar material that allows the user 62 to more comfortably move position the viewing region 82 in close proximity to the user's eye 70 (e.g., pressing the foam pad against the user's 62 forehead and/or upper cheek). Regardless, the microphone 62 is similarly disposed or "exposed" on the first face 50, below (relative to the orientation of FIGS. 3A and 3B) the viewing region 82.

Figure 3C:
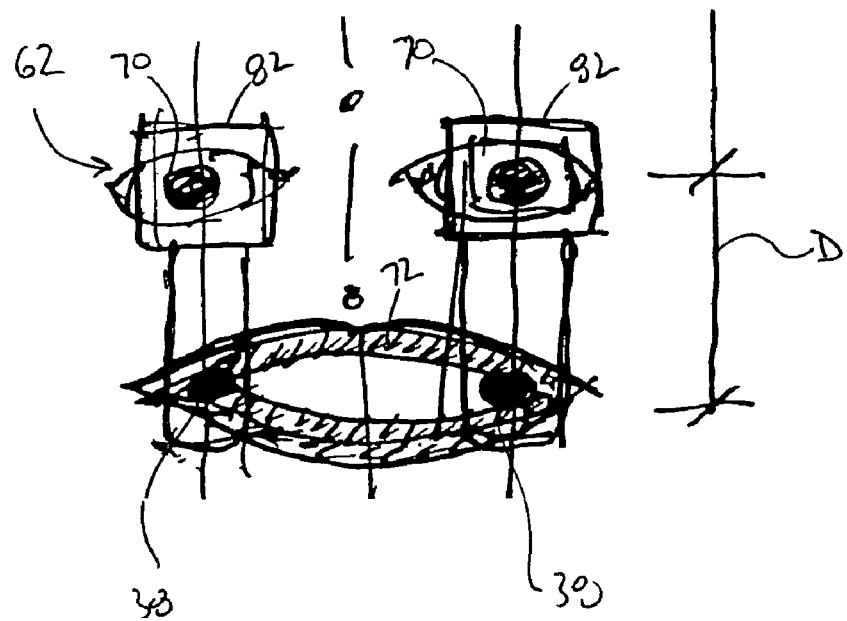
FIG. 3C is a schematic front view illustrating a relationship between components of the mobile personal computer of FIG. 1 and a user in a left or right hand/eye position.

In one embodiment, the case 22 is adapted such that a longitudinal distance "D" (or vertical distance relative to the orientation of FIGS. 3A and 3B) between a horizontal centerline (relative to an upright position of the mobile personal computer 20) of the viewing region 82 and the microphone 38 is formed as a function a human factor standard. In particular, in one embodiment, the longitudinal distance D approximates the normal or "standard" longitudinal distance between an eye and mouth of an average human adult. Studies have shown that average longitudinal distance between the eye and mouth of an average human adult is in the range of 2-3 inches. With this in mind, the longitudinal distance D is also preferably 2-3 inches, more preferably approximately 2.5 inches. As a result, and as shown in FIGS. 3A and 3B, when the user 62 positions the case 22 such that the viewing region 82 is directly at one of the user's eyes 70, the microphone 38 will naturally be positioned at the user's mouth 72, greatly enhancing the speech recognition operations while the display screen 36 is being viewed. Along these same lines, a vertical centerline (relative to an upright orientation of the mobile personal computer 20) of the viewing region 82 is, in one embodiment, aligned with the microphone 38. As shown in FIG. 3C, this one preferred relationship positions a corner of the user's mouth 72 at or over the microphone 38 as the user's eye 70 is positioned at the viewing region 82. This preferred location of the user's mouth 72 optimizes noise cancellation functioning of the microphone 38/speech recognition system 26. Notably, and as illustrated in FIG. 3C, this one preferred mouth location is achieved regardless of whether the viewing region 82 is position at the left or right eye of the user 62. As a further benefit, it has surprisingly been found that adult human form factors of palm size and mouth/eye longitudinal distance are approximately equal such that where the case 22 and related components follow the above-described parameters, the case 22 will naturally "fit" in the user's hand 60 while at the same time optimally position the viewing region 82 and the microphone 38. While it may be possible to provide an even further reduced-sized case, in one embodiment, the case 22 preferably comports with the above-described dimensional constraints, as does a relationship between the viewing region 82 and the microphone 38. It will be understood that while alternative embodiments described below add additional features to the mobile personal computer 20, these features do not affect the optimized handling and viewing region 82/microphone 38 relationship afforded by the mobile personal computer 20 of FIGS. 1-3C.

Figure 4:
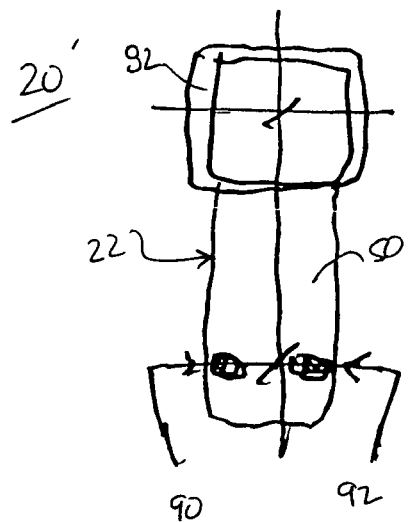
FIG. 4 is a simplified front view of an alternative embodiment mobile personal computer in accordance with the present invention.

While the mobile personal computer 20 has been described as having a single microphone 38, a plurality of microphones can alternatively be provided. For example, FIG. 4 illustrates an alternative embodiment mobile personal computer 20' having components similar to the mobile personal computer 20 (FIG. 1) previously described (with like elements being similarly numbered), and further including first and second microphone 90, 92. The microphones 90, 92 are akin to the microphone 38 (FIG. 1) previously described, and are provided as part of the speech recognition system 26 (FIG. 2). The microphones 90, 92 are disposed on the first face 50 of the case 22, and are positioned below the viewing region 82 in an offset relationship relative to the vertical centerline thereof. With this embodiment, both microphones 90, 92 operate in tandem to capture sounds uttered by the user (not shown), as well as provide noise cancellation information. In an alternative embodiment, a control actuator (not shown), such as a mouse, switch, thumbwheel, pad, etc., is disposed between the microphones 90, 92. With this optimal placement, a user's thumb (not shown) will not cover both of the microphones 90, 92 while operating the control actuator, thus allowing proper functioning of the speech recognition system 26 (FIG. 2). In another alternative embodiment, the microphones 90, 92 can perform differing functions; for example, one of the microphones 90 or 92 can perform more fundamental noise cancellation. With this configuration, the mobile personal computer 20' can be further adapted to implement operation of the microphones 90, 92 depending upon whether the user is right handed or left handed. This feature can be further augmented by the mobile personal computer 20' receiving information from the user (e.g., pressing a button or touch pad) indicative of right handed or left handed operation.

Figure 5:
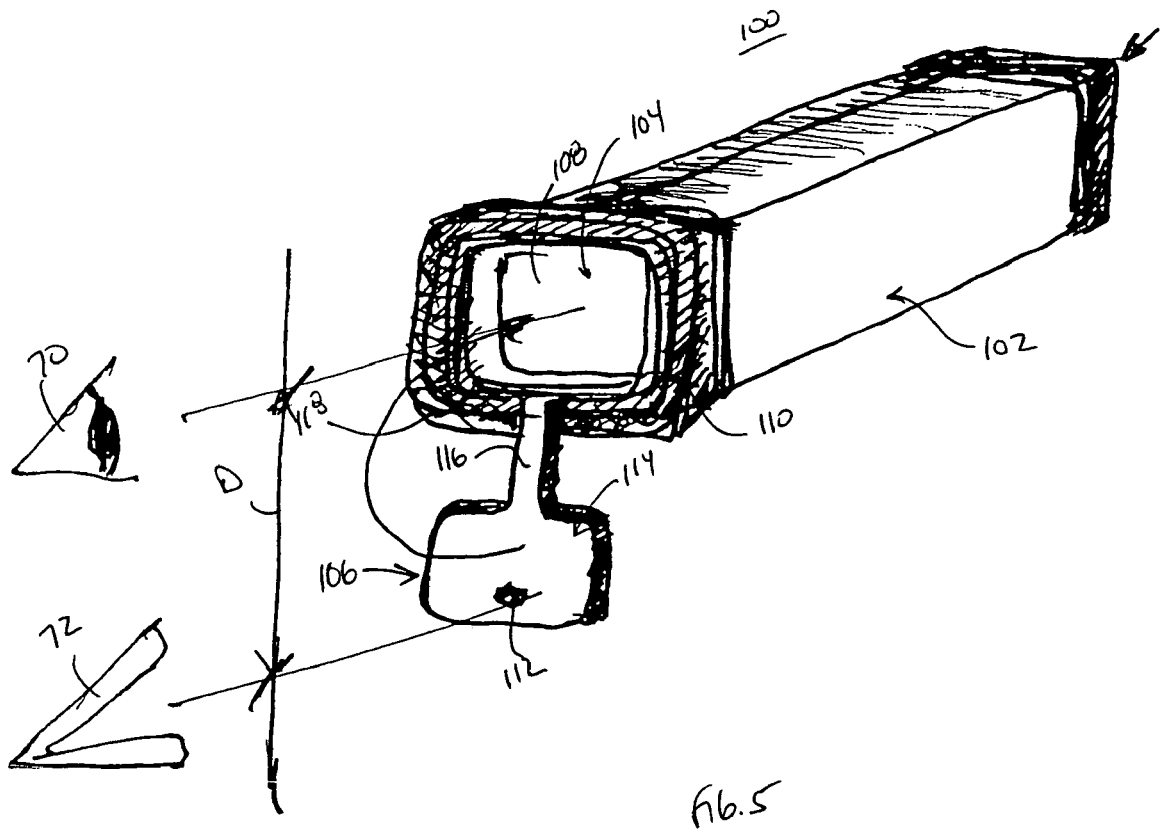
FIG. 5 is a perspective view of an alternative embodiment mobile personal computer in accordance with the present invention.

FIG. 5 illustrates another alternative embodiment mobile personal computer 100 incorporating an alternative microphone configuration. The mobile personal computer 100 is similar to the mobile personal computer 20 (FIG. 1) described above, and generally includes a case 102, a display system 104 (referenced generally), a speech recognition system 106 (referenced generally), a microprocessor (not shown, but akin to the microprocessor 28 of FIG. 2), and a power source (not shown, but akin to the power source 30 of FIG. 2). The display system 104 includes a display screen 108 viewable via a viewing region 110 defined by the case 102. Further, the speech recognition system 106 includes a microphone 112 deployable in the manner described below.

The microphone 112 is provided as part of (e.g., embedded within) a flap 114 defined by the case 102 that is otherwise connected to a remainder thereof by a connection piece 116, such as a living hinge. In the view of FIG. 5, the flap 114 is deployed to an "in use" position whereby the flap 114 is drawn away from the viewing region 110 (e.g., the flap 114 extends downwardly in a generally planar fashion relative to a remainder of the case 102). In the "in use" position, the flap 114 and the viewing region 110 combine to define a face 118 of the case 102 (akin to the first face 50 of FIG. 1). The microphone 112 is offset from a horizontal centerline of the viewing region 110 by the longitudinal distance D commensurate with human form factor longitudinal distance between the user's eye 70 and mouth 72.

When the mobile personal computer 100 is not being used (e.g., the user 62 does not wish to view the display screen 108 and/or perform speech recognition operations), the flap 114 is moved to a closed position whereby the connection piece 116 is folded or otherwise hinged to position the flap 114 over the viewing region 110. With this one embodiment, then, the flap 114 serves to protect the display screen 108 when not in use.

Figure 6A:
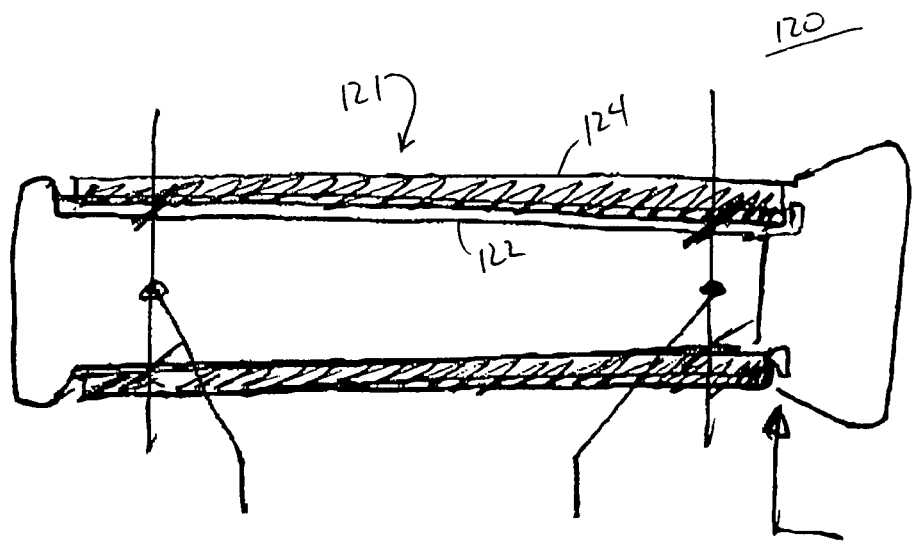
FIG. 6A is a simplified, top view of an alternative embodiment mobile personal computer in accordance with the present invention.

Returning to FIG. 1, components contained within the case 22 can be accessed in a variety of fashions, such as by removing one or more sides/ends of the case 22. Alternatively, FIG. 6A illustrates an alternative embodiment mobile personal computer 120 having a case 121 adapted to facilitate more rapid internal component access and exchange as well as a modular arrangement of various components in accordance with one alternative embodiment of the present invention.

Figure 6B:
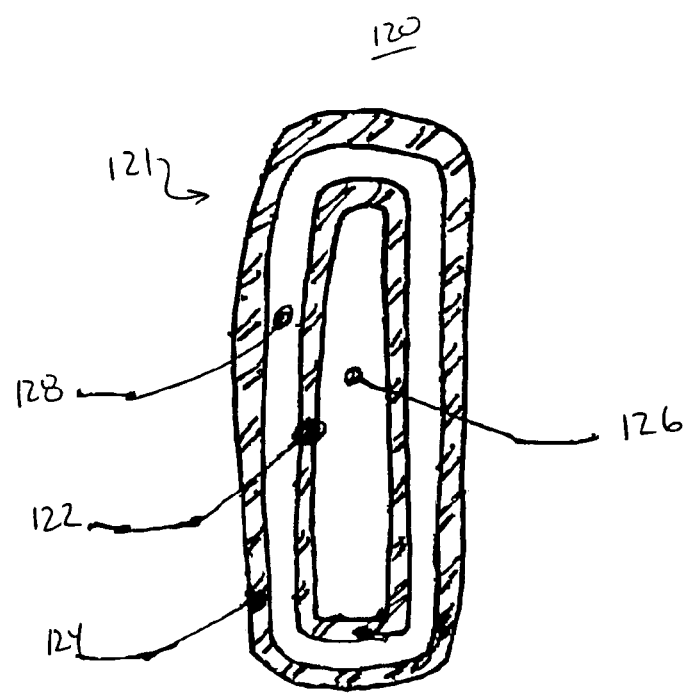
FIG. 6B is a cross-sectional view of the mobile personal computer of FIG. 6A.

The case 121 is formed as a tube-in-tube construction including an inner tube 122 disposed within an outer tube 124. The tubes 122, 124 are preferably extruded so as to provide strength, continuous heat dissipation, savings in manufacturing costs, and ease of water proofing. As described below, the tube-in-tube construction can position various modules along the inner tube 122, and sufficient spacing is provided between the tubes 122, 124 for provision of a power supply 126 as shown in FIG. 6B. FIG. 6B further illustrates a spacing 128 between the tubes 122, 124 for placement of printed circuits (not shown) as described below.

Figure 7A:
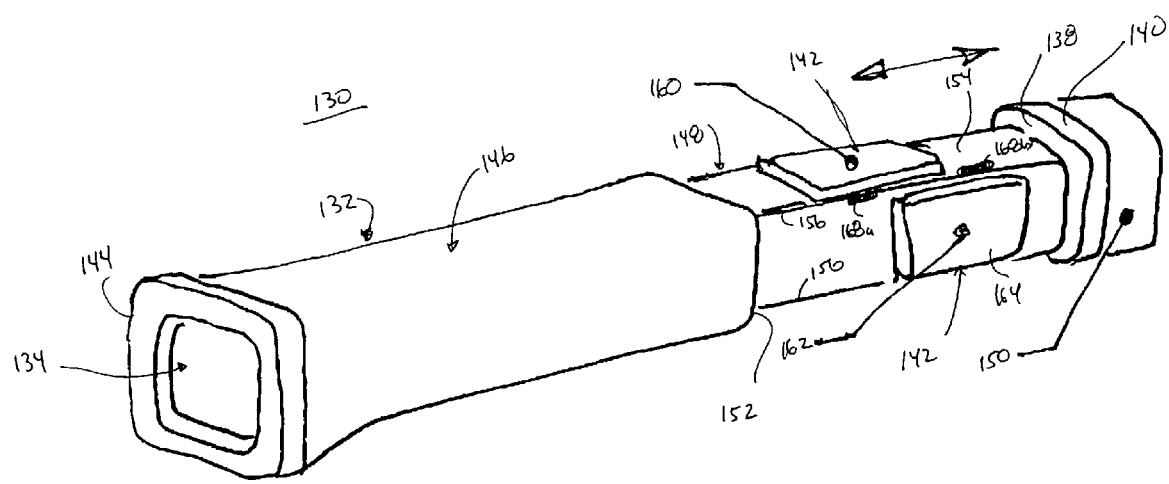
FIG. 7A is an exploded, perspective view of an alternative embodiment mobile personal computer in accordance with the present invention.

With the above general parameters of a tube-in-tube construction in mind, FIG. 7A illustrates one embodiment of a mobile personal computer 130 is akin to the mobile personal computer 20 (FIGS. 1 and 2) previously described, and includes various components such as a display system 134 (referenced generally), a speech recognition system (not specifically shown), a microprocessor 138, a power source 140 (referenced generally), and auxiliary components 142. It should be noted that various components associated with the display system 134 (such as a display screen) and the speech recognition system (such as a microphone(s)) are not shown in FIG. 7A for ease of illustration. These components can be placed directly on a face of the case 132. Alternatively, these components can be provided as part of a plug-in device (not shown) that attaches to an end 144 of the case 132 in a manner that accomplishes electrical connection to corresponding hardware and/or directly to the microprocessor 138. With this alternative approach, upon assembly, the plug-in device forms a face of the case 132 (e.g., the face 50 of FIG. 1) that defines a viewing region for viewing items generated on a display screen and provides a microphone below the viewing region (relative to an upright orientation of the mobile personal computer 130).

Regardless, the case 132 associated with the embodiment of FIG. 7A is in the form of an extruded tube that is square, rectangular, circular, etc., in transverse cross-section. In one embodiment, the case 132 includes a housing 146 and a drawer 148. The drawer 148 is sized to be slidably received and nested within the housing 146. In one embodiment, the drawer 148 forms a trailing end or core 150 that seals against an end 152 of the housing 146 when the drawer 148 is fully inserted within the housing 146. In one embodiment, the display screen (not shown) is provided as part of or otherwise attached to, the housing 146, and in other embodiments, as part of, or attached to, the drawer 148.

The drawer 148 defines, in one embodiment, an open side 154 through which components (such as one or more of the auxiliary components 142) can be accessed. For example, in one embodiment, the drawer 148 includes rails 156 (four of which are shown in FIG. 6) slidably connected to the housing 146. A number of alternative configurations for the drawer 148 are equally acceptable. Regardless, a spacing between the rails 156 (or other, similar body or bodies) allows a user (not shown) to remove, insert and/or replace various components of the mobile personal computer 130. For example, the power source 140 is a battery shown in block form in FIG. 7A. Over time, it may become necessary to replace the battery power source 140. This replacement is easily accomplished by simply sliding the drawer 148 from the housing, removing the old battery power source 140 from the drawer 148, inserting a new batter power source 140 into the same location of the drawer 148, and then closing the drawer 148 relative to the housing 146.

In a similar manner, other components of the mobile personal computer 130 can be accessed and replaced. In one embodiment, the auxiliary components 142 can be described as sub-system modules, such as sub-system modules 160, 162. While illustrated in block form, the sub-system modules generally include an outer frame 164 (referenced generally) maintaining a device (not shown) on which a desired feature is provided and an electronic connector (not shown) on an exterior thereof. As described in greater detail below, the electronic connector facilitates an electronic communication/connection to the microprocessor 138. While two sub-system modules 160, 162 are shown, any number, either greater or lesser, can be provided. Regardless, each sub-system module provides a dedicated feature or function. By way of example only, the first sub-system module 160 can be a language translation software module formatted to convert a first designated language into a second designated language, whereas the second sub-system module 162 is a transceiver system (or other hardware or device convergence system). Of course, a wide variety of other operational activities (e.g., software or hardware such as radio, processor, powersupply, camera, etc.) can be embodied by the sub-system modules 160, 162. Regardless, the sub-system modules 160, 162 can be inserted into or removed from the drawer 148 independent of the other (and independent of any other components of the mobile personal computer 130). Thus, for example, where the first sub-system module 160 is adapted to provide a bookkeeping-type software program becomes outdated, the first sub-system module 160 can simply be removed from the drawer 148 and swapped or replaced with a third sub-system module (not shown) maintaining an updated version of the bookkeeping-type software. Similarly, where the second sub-system module 162 is a camera-related system, it can be swapped or replaced with a fourth sub-system module (not shown) providing an upgraded camera system.

In certain instances, a user (not shown) may need or desire to swap or otherwise replace multiple ones of the sub-system modules 160, 162 at the same time. Because, as described in greater detail below, the sub-system modules 160, 162 have a dedicated physical location within the drawer 148 commensurate with connections/wiring to the microprocessor 138, it may be imperative that the replacement sub-system modules (not shown) be placed in the drawer 148 at a specific location. With this in mind, and in one embodiment, the drawer 148 includes or displays indicia (referenced generally at 168a, 168b) that indicates proper sub-system module placement relative to the drawer 148 (e.g., the first indicia 168a corresponds with a first location in the drawer 148, whereas the second indicia 168b corresponds with a second location in the drawer 148). For example, in one embodiment, one of the rails 156 displays the first indicia 168a as a first color (e.g., blue) and the second indicia 168b as a second color (e.g., red), different from the first color. Alternatively, other coding schemes can be employed (e.g., number, letters, symbols, pictures, textures, etc.) that correlate with a particular operational activity. Regardless, the sub-system module frames 164 similarly display a corresponding one of the indicia 168a or 168b. For example, the frame 164 of the first sub-system module 160 displays the first color and the frame 164 of the second sub-system module 162 displays the second color. A third sub-system module (not shown) adapted to perform the same functional activity as the first sub-system module 160 would also display the first color. With this approach, when swapping the third sub-system module for the first sub-system module 160, the user need only match the color (or other indicia) on the frame of the third sub-system module with the appropriate color 168a (or other indicia) on the drawer 148 to readily ascertain proper location for installing the third sub-system module into the drawer 148.

The sub-system modules 160, 162, as well as portions or entireties of other system components (e.g., the display system 134, speech recognition system 136, and/or power source 140), can be electronically connected to the microprocessor 138 in a variety of fashions. In one embodiment, dedicated electrical couplers (not shown) are maintained by the case 132 for electronically connecting individual components in a known fashion. With respect to the one embodiment of FIG. 7A in which the case 132 includes the housing 146 and the drawer 148, the electrical couplers (e.g., surface mounted plugs or ports, edge mounted plugs or ports, snap-fit plugs or ports, etc.), can be provided at pre-determined locations on the drawer 148 such that when each sub-system module 160 or 162 is inserted into the drawer 148, the corresponding electrical connector (not shown) carried by the frame 164 thereof interfaces with the desired electrical coupler of the case 132. In other words, the drawer 148 can be viewed as defining a plurality of slots (either theoretical or physical), with each slot having a dedicated operational function and corresponding electrical coupler for connecting to a corresponding sub-system module to the microprocessor 138 via a known wiring schematic. For example, a first "slot" defined by the drawer 148 can be assigned to language translation and a second slot can be assigned to maps. The microprocessor 138, in turn, is adapted to always poll the first slot whenever a language translation operation is requested by a user, and the second slot whenever maps are requested. Alternatively, the electrical coupler(s) can be discretely located along an interior of the housing 146 such that when the drawer 148 is closed relative to the housing 146, the sub-system modules otherwise carried by the drawer 148 will be properly aligned, and thus electronically connected to, the desired electrical coupler.

Figure 7B:
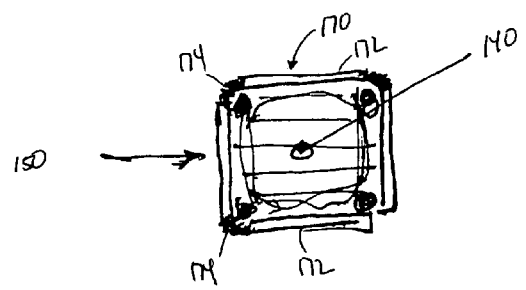
FIG. 7B is a cross-sectional view of an alternative embodiment mobile personal computer in accordance with the present invention.

To minimize an overall size of the mobile personal computer 130, flexible printed circuits are preferably employed to make the various electrical connections described above. For example, FIG. 7B is a simplified cross-sectional view of the core 150, illustrating printed circuit board 170 and the power supply 140. The power supply 140 is maintained in the core 150. The printed circuit boards 170 are secured to an exterior surface of the core 150 and/or an interior surface of the case 132 (FIG. 7A), and includes rigid portions 172 and flexible portions 174. The rigid portions 172 extend along relative "straight" sides of the core 150/case 132, whereas the flexible portions 174 traverse corners of the core 150/case 132. Flexible circuit boards are known in the art, and can readily be manufactured to nest along tight corners. With this one preferred configuration, then, a relatively large amount of printed circuit board surface area is provided while occupying a minimal amount of internal space of the case 132. Further, this one construction provided improved heat dissipation contact with the case/core 150 is the flexible portions 174 are independent of one another and can be pressed against a side of the case 132 resulting in heat release from the printed circuit board 170 to the case 132.

Additional auxiliary component applications are described in the alternative embodiments set forth below. Further, though not shown, any of the mobile personal computer embodiments described (such as the mobile personal computer 20) can, in one embodiment, incorporate a motion sensor (not shown) or similar device that is electronically connected to the microprocessor 28 (FIG. 2). With this configuration, the microprocessor 28 can further be adapted to recognize and implement an operational mode of the mobile personal computer 20 based upon information signaled by the motion sensor to further optimize power consumption. For example, in one embodiment, the mobile personal computer 20 is adapted such that when the motion sensor does not sense "movement" of the case 22 for extended periods of time (e.g., 10-20 minutes), the microprocessor 28 will determine that the mobile personal computer 20 is not being used, and implement a "sleep" mode whereby power to the various components is reduced to as low a level possible regardless of whether a user (not shown) actually turns the mobile personal computer 20 "off". Later, when the user moves the mobile personal computer 20 (otherwise indicative of the user desiring to use the mobile personal computer 20), this motion will be sensed by the motion detector and signaled to the microprocessor 28. The microprocessor 28 will, in turn, immediately transition from the sleep mode and initiate a "power up" mode or "operational" mode whereby all components are powered to a normal functioning level. Again, this occurs without the user being required to manually execute an "activation" operation (e.g., pressing buttons, etc.). Alternatively, a wide variety of other operational modes activities can be facilitated based upon information from the motion detector. However, the motion detector is not a required component of the present invention.

Additional operational state affecting secondary sensor(s) can also be incorporated into the mobile personal computer 20. For example, a sensor can be provided on or at the viewing region 82 for sensing information indicative of the viewing region 82 being pressed against the user's face, a voice level sensor for sensing information indicative of a user speaking into the microphone 38, and/or a pressure sensor or similar device along a perimeter of the case 22 for sensing information of a user holding the case 22. Those situations are indicative of a user desiring to actually use the computer 20. Thus, in an alternative embodiment, information from the motion sensor can be employed to switch between a "deep sleep" operational mode (i.e., minimal power) and a "sleep" operational mode (e.g., components being partially powered); whereas information from the secondary "use" sensors (e.g., eye sensor, voice level sensor, handling sensor, etc.) employed to switch between the "sleep" operational mode and an "active" operational mode (e.g., many or all components fully powered).

Figure 8A:
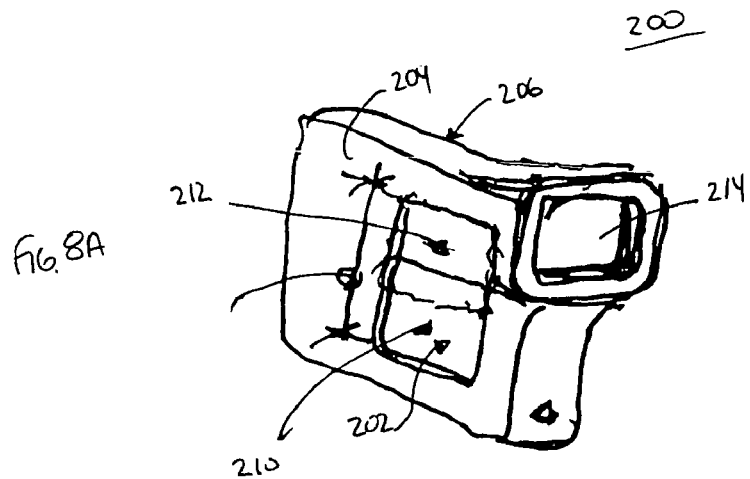
FIG. 8A is a perspective view of an alternative embodiment mobile personal computer in accordance with the present invention.

As previously described with reference to the mobile personal computer 20 of FIGS. 1 and 2, the auxiliary component(s) 34 can include one or more touch pads and/or mouse operators. With this in mind, FIG. 8A illustrates another alternative embodiment mobile personal computer 200 similar to the mobile personal computer 20 (FIGS. 1 and 2) previously described, and further including a touch pad 202 formed along a side 204 of a case 206. The touch pad 202 is electronically connected to the microprocessor (not shown) and is configured to define first and second regions 210, 212. In particular, the case 206 and the touch pad 202 are configured such that when the case 206 is naturally held in a single hand (not shown) of a user (not shown), the user's thumb naturally contacts/interfaces with the first region 210, whereas the user's finger(s) (of the same hand) naturally contact/interface with the second region 212. In one embodiment, a pressure sensitive membrane (not shown) is disposed beneath the touch pad 202 for sensing pressure applied by the user to a particular location along the touch pad 202 and/or a pattern entered by the user (e.g., a "double tap"). The touch pad 202 is, in one embodiment, configured such that interface with the first region 210 controls a first operation or activity, and interface with the second region 212 controls a second operation or activity different from the first operation. For example, the first region 210 can serve to control movement of a mouse/cursor (not shown) otherwise viewable on the display screen 214 (referenced generally), whereas the second region 212 can control brightness or contrast of the display. Countless other discrete operations or activities can be controlled by the first and second regions 210, 212 (e.g., volume control where the mobile personal computer 200 includes a speaker, first and second cursors, dedicated browsing operations such as scrolling or panning, dedicated functions such as on/off or program selection, etc., to name but a few). Further, the touch pad 202 can consist of two or more discrete touch pads.

Figure 8B:
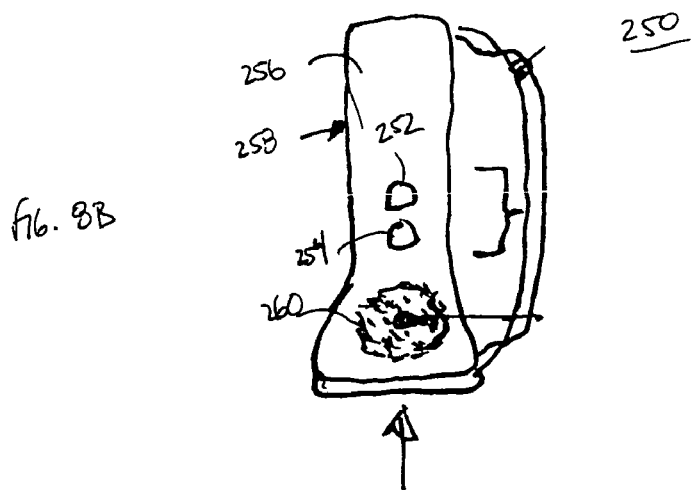
FIG. 8B is a top view of the mobile personal computer of FIG. 8A.

Similarly, another alternative embodiment mobile personal computer 250 is shown in top view in FIG. 8B. The mobile personal computer 250 is akin to the mobile personal computer 20 (FIGS. 1 and 2) previously described, and further includes first and second buttons 252, 254 disposed on a top 256 of a case 258 thereof. The buttons 252, 254 are located, and the case 258 is sized, such that when the case 258 is naturally grasped in a single hand (not shown) of a user (not shown), the user's finger(s) (not shown) can naturally and easily interface with the buttons 252, 254. With this in mind, the buttons 252, 254 are electronically connected to the microprocessor (not shown) and can be thus be provided to control a multitude of different operations. For example, the first button 252 can control a first browsing operation (e.g., panning) and the second button 254 can control a second browsing operation (e.g., scroll). In addition, the mobile personal computer 250 further includes, in one embodiment, a speaker 260.

Figure 8C:
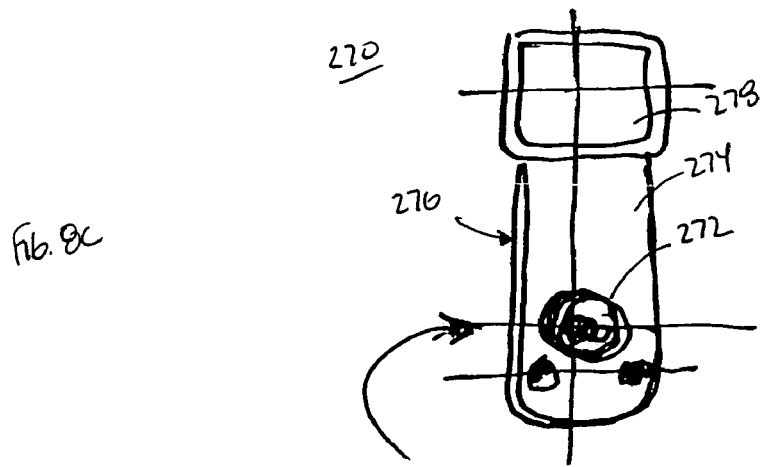
FIG. 8C is a front view of an alternative embodiment mobile personal computer in accordance with the present invention.

Yet another alternative embodiment mobile personal computer 270 is shown in FIG. 8C. The mobile personal computer 270 is akin to the mobile personal computer 20 (FIGS. 1 and 2) previously described, a further includes a control device 272 located on a front face 274 of a case 276 thereof. The control device 272 can assume a variety of forms, such as a switch, lever, wheel, etc. Regardless, the control device 272 is electronically connected to a microprocessor (not shown), via known circuitry. Further, the control device 272 is configured, and the case 276 is sized, such that when the case 276 is naturally grasped in a single hand (not shown) of a user (not shown), the user's thumb can naturally and easily manipulate the control device 272. With this in mind, the control device 272 can be employed to control a variety of different functions associated with operation of the mobile personal computer 270. For example, the control device 272 can be manipulated to control a mouse/cursor otherwise displayed on a display screen 278 (referenced generally) provided with the mobile personal computer 270. Alternatively, the mobile personal computer 270 can be adapted such that manipulation of the control device 272 controls activation of the mobile personal computer 270, selection of a desired program, etc.

Figure 9A:
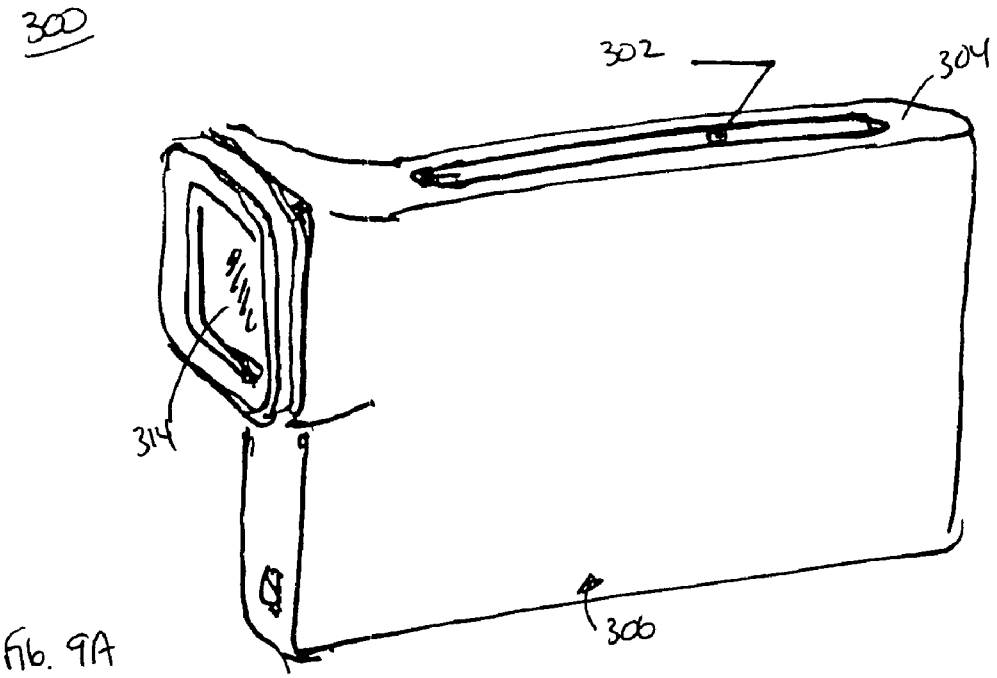
FIG. 9A is a perspective view of an alternative embodiment mobile personal computer in accordance with the present invention.
Figure 9B:
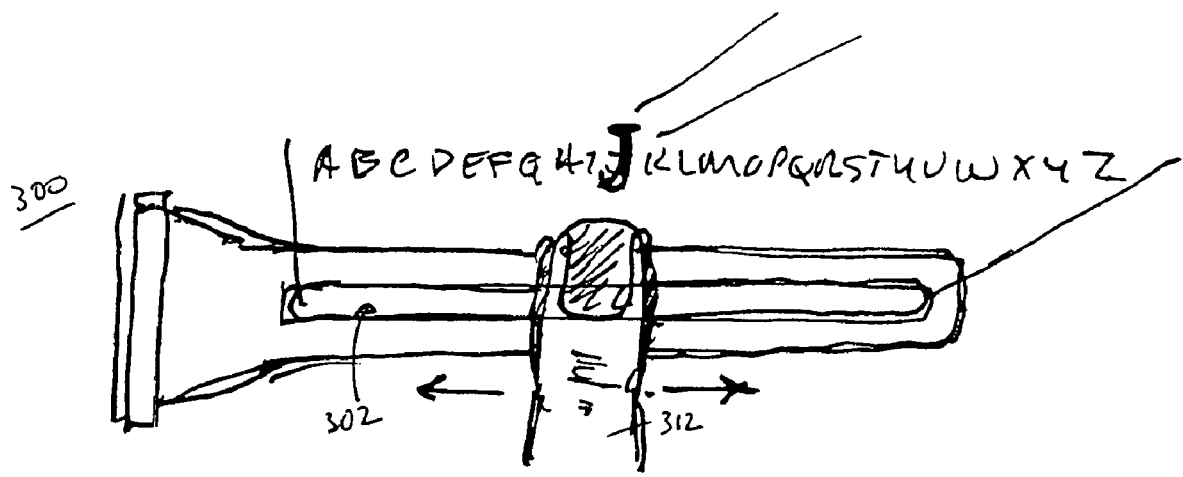
FIG. 9B is an enlarged top view of a linear touch pad portion of the mobile personal computer of FIG. 9A.

Yet another alternative embodiment mobile personal computer 300 is shown in FIG. 9A. The mobile personal computer 300 is akin to the mobile personal computer 20 (FIGS. 1 and 2) previously described, and further includes a linear touch pad 302 disposed along a top 304 of a case 306 thereof. In one embodiment, a pressure sensitive membrane (not shown) is disposed beneath the linear touch pad 302. The linear touch pad 302 is positioned, and the case 306 is sized, such that when the case 306 is naturally held in a single hand (not shown) of a user (not shown), the user's finger(s) (not shown) naturally and easily interface with the linear touch pad 302 that is otherwise electronically connected to the microprocessor (not shown). With this in mind, the linear touch pad 302 can be adapted to facilitate a variety of user interfaces. In one embodiment, the linear touch pad 302 is a dedicated keyboard by which the user can highlight and/or select desired letter(s), number(s), punctuation(s), word(s), and/or combinations thereof. For example, as shown in the enlarged view of FIG. 9B, the linear touch pad 302 can have designated letters (or numbers) assigned to discrete linear locations thereon. When the user's finger 312 "taps" on a particular location along the linear touch pad 302, the corresponding letter (or number) will appear or be highlight on the display screen 314 (FIG. 9A). To this end, when activated, the display screen 314 can display a list of letters, number and/or characters (e.g., punctuation); by scrolling the user's finger 312 along the linear touch pad 302, the letter (or number or character) corresponding the finger's 312 location relative to the touch pad 302 will be "highlighted" on the display screen. When the letter (or number or character) desired by the user is highlighted, the user simply "taps" the linear touch pad 302 to select that letter. The mobile personal computer 300 can be further adapted to alter the information selectable via the linear touch pad 302, such as by a "double tap" (e.g., the user "double taps" the linear touch pad 302 to switch between a series of numbers and a series of letters).

The linear touch pad 302 has a wide variety of applications, and is particularly useful with speech recognition. In general terms, speech recognition entails a user speaking into the microphone (not shown) and words being recognized appearing on the display screen 314 (FIG. 9A). With this technique, a user can readily confirm that the system is recognizing the word(s) intended by the user. While current speech recognition software is quite proficient at recognizing most words spoken by a user (following appropriate "training"), in many instances, errors can occur. One approach for addressing this possibility is for a series of words to appear on the display screen 314 in order of probability of "match" to the word spoken by the user (e.g., the user may say "two" and the words "to", "too", and "two" will appear on the display screen 314). The linear touch pad 302 affords the user the ability to quickly select the desired term by assigning each of the listed words to a location on the linear touch pad 314. The user can, for example, slide his/her finger 312 along the linear touch pad 314 until the desired word is highlighted on the display screen 314 and then "double tap" the linear touch pad 313 to "select" the word (e.g., insert the highlighted word into the document being processed).

Figure 9C:
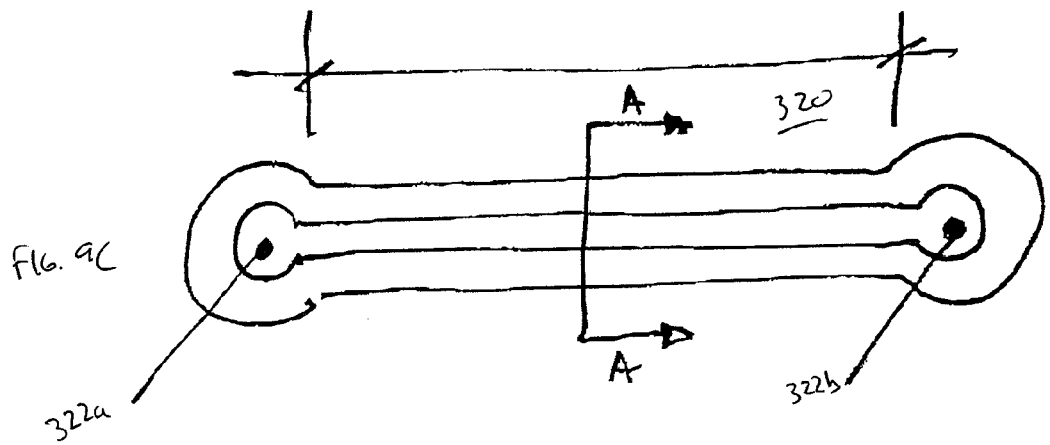
FIG. 9C is an enlarged top view of an alternative embodiment linear touch pad for use with the mobile personal computer of FIG. 9A.
Figure 9D:
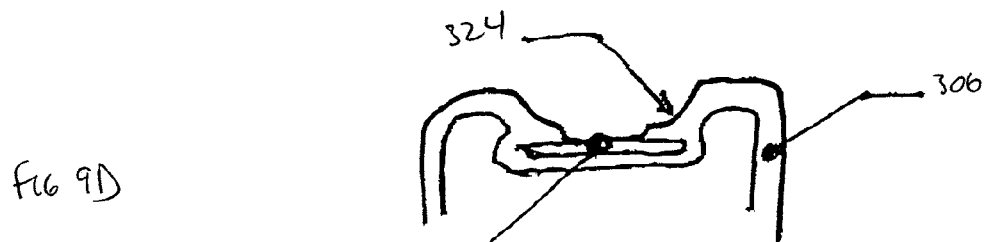
FIGS. 9D and 9E illustrate assembly of the linear touch pad of FIG. 9C to a case.
Figure 9E:
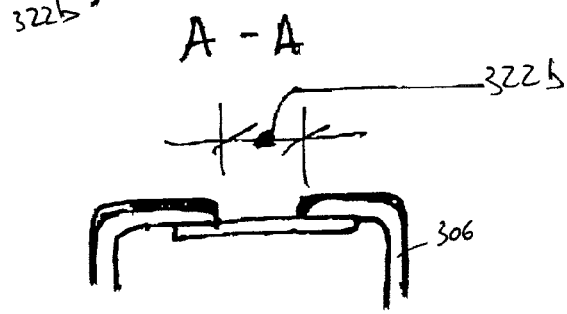

FIG. 9C is an alternative embodiment linear touch pad 320 useful with the mobile personal computer 300 of FIG. 9A. The linear touch pad 320 is similar to the linear touch pad 312 previously described, and further includes dimples (or similarly textured body) 322a, 322b at opposing ends thereof. The personal computer 300 can be adapted such that when one of the dimples 322a or 322b is pressed by the user (not shown), a common activity occurs (e.g., a common punctuation is inserted into the document being processed). Further a separate activity occurs when both dimples 322a, 322b are pressed simultaneously. For example, a functional "purpose" of the linear touch pad 320 can change when both dimples 322a, 322b are pressed (e.g., operation of the linear touch pad 320 switches from numbers to letters, or to words, or to punctuation, etc.). To ensure that the dimples 322a, 322b are not unintentionally pressed during normal handling, the case 306 can include a curved recess or valley 324 within which the linear touch pad 320 is received, as shown in FIG. 9D or the thickness of the case 306 itself as shown in FIG. 9E.

Figure 10:
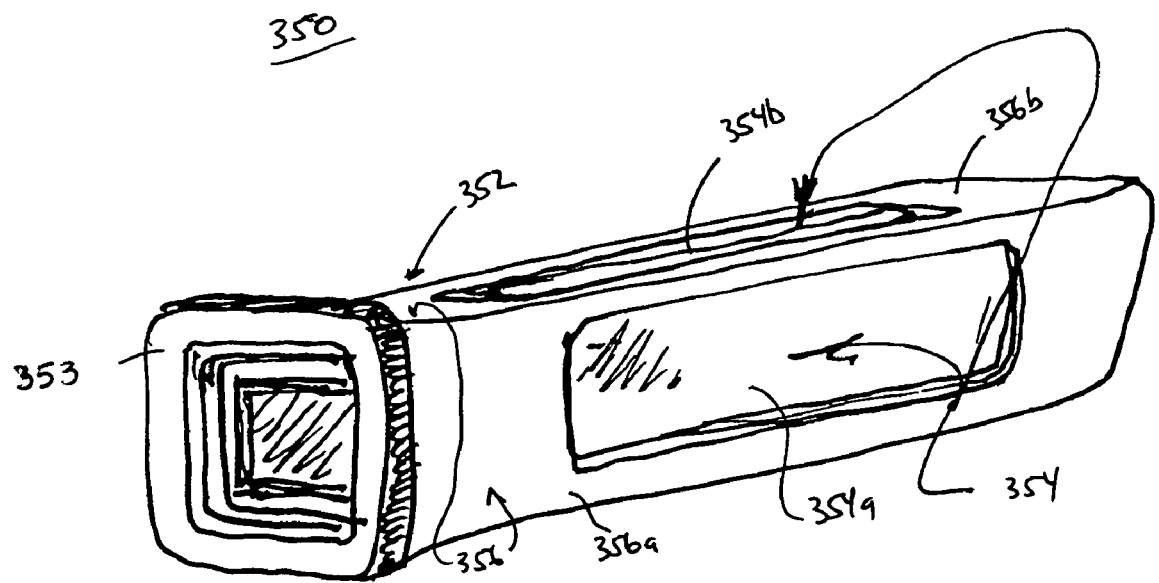
FIG. 10 is a perspective view of an alternative embodiment mobile personal computer in accordance with the present invention.

Yet another alternative embodiment mobile personal computer 350 is shown in FIG. 10. The mobile personal computer 350 is similar in certain respects to previous embodiment, and includes a case 352. Other components, such as display system including a display screen, a speech recognition system including a microphone, a microprocessor, and a power source, are not shown in FIG. 10 for ease of illustration, but can assume any of the forms previously described. For example, in one embodiment, the display screen and the microphone are provided as part of a separate plug-in device (not shown) that can be connected to a leading end 353 of the case 352, it being understood that upon assembly, the plug-in device defines a face of the case 352. Regardless, the mobile personal computer 350 includes a plurality of touch pads 354 (referenced generally), including the touch pads 354a, 354b. More particularly, the case 352 defines sides 356 (referenced generally), including the sides 356a and 356b illustrated in FIG. 10. A remaining two sides of the case 352 are hidden in the view of FIG. 10. With this in mind, respective ones of the touch pads 354 are disposed along, and thus accessible at, respective ones of the sides 356 (it being understood that although not shown, the sides of the case 352 otherwise hidden in the view of FIG. 10 maintain touch pads in a fashion similar to the sides 356a, 356b). Alternatively, less then all of the sides 354 of the case 352 can maintain a touch pad 354. Even further, a single touch pad 354 can continuously extend or "wrap" along two or more of the sides 356 of the case 352. Regardless, the plurality of touch pads 354 is electronically connected to the microprocessor.

In one embodiment, the mobile personal computer 350 is adapted such that each of the touch pads 354 facilitates control over a differing operational function. For example, a first one of the touch pads 354 (e.g., the touch pad 354a) can be designated to control movement of a cursor/mouse displayed on the display screen (not shown), whereas a second one of the touch pads 354 (e.g., the touch pad 354b) can be designated to control specific browsing operation(s) such as zoom/pan/tilt. Alternatively, any other operational control feature can be associated with respective ones of the touch pads 354. Further, the touch pads 354 can be zoned for type(s) of use.

In an alternative embodiment, the mobile personal computer 350 is adapted such that only selected one(s) of the touch pad(s) 354 are "operational", and/or the operational control feature associated with respective ones of the touch pads 354 changes, depending upon an orientation of the case 352. With this embodiment, the mobile personal computer 350 includes an orientation sensor (not shown), such as a roll or motion sensor, within the case 352. The orientation sensor is electronically connected to the microprocessor (not shown) and signals information indicative of a rotational position of the case 352 relative to a user (or the earth). With this in mind, the mobile personal computer 350 is adapted to, upon determining a rotational position of the case 352 (such as by the microprocessor based upon information from the orientation sensor), automatically select and assign an operational status for each of the touch pads 354. For example, in the rotational orientation of FIG. 10, the microprocessor can select and assign an operational status of "cursor control" for the first touch pad 354a, an operational status of "browsing control" for the second touch pad 354b, and deactivate remaining ones (not shown) of the touch pads 354. Continuing this same example, when the mobile personal computer 350 determines that the rotational orientation of the case 352 has changed from the position of FIG. 10 (e.g., a user (not shown) rotates the case 352 ninety degrees clockwise such that the second side 356b is in the position of the first side 356a in the position of FIG. 10, and the first side 356a is the "bottom" of the case 352), the microprocessor can automatically select and assign an operational status of "deactivated" or "changed purposes" for the first touch pad 354a, an operational status of "cursor control" for the second touch pad 354b, and an operation status of "browsing control" for the touch pad (not shown) now at the "top" of the case 352 orientation. It will be understood that this is but one example of the virtually limitless operational status selection and assignment protocols that can be implemented by the mobile personal computer 350, and again, all touch pads 354 can be "activated" at all times, but have differing assigned operational control features depending upon a rotational orientation of the case 352.

In one embodiment, the mobile personal computer 350 includes indicia (not shown) indicating to a user what function each touch pad performs in each rotational position of the case 352. In alternative embodiments that may or may not include one or all of the touch pads 354, the mobile personal computer 350 is adapted to automatically implement a particular operation made when it is sensed or otherwise determined that the personal computer 350 is being held or operated in a pre-determined position. For example, when it is determined that the personal computer 350 is being held to the ear and mouth of the user, the mobile personal computer will automatically initiate a "telephone" mode of operation. Alternative, the mobile personal computer 350 can be adapted such that a movable mechanical component is provided along, or as an integral part of, the case 352. Much like a kaleidoscope, rotation of the movable component relative to a remainder of the case 352 can effectuate a change in the functional purpose of the touch pad(s) 354, selected operational activity of personal computer 350, etc. This kaleidoscope effect can optionally or alternatively be accomplished via a gravity sensor (not shown) within the case 352 or other device capable of sensing a rotational position of the case 352. Further, the image on the display screen can rotate to implement or active a new program or application.

Figure 11A:
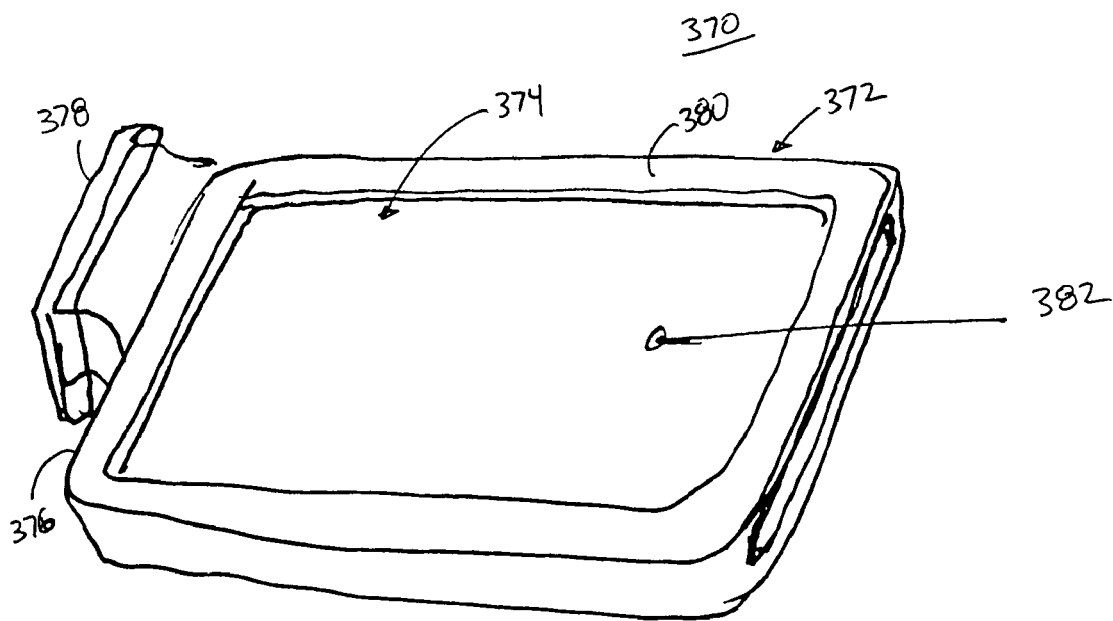
FIG. 11A is a perspective view of an alternative embodiment mobile personal computer in accordance with the present invention.

Yet another alternative embodiment mobile personal computer 370 is shown in FIG. 11A. The mobile personal computer 370 is similar in many respects to the mobile personal computer 20 (FIGS. 1 and 2) previously described, and includes a case 372, a display system 374 (referenced generally), a speech recognition system (not shown, but similar to the speech recognition system 26 previously described with reference to FIGS. 1 and 2), a microprocessor (not shown, but similar to the microprocessor 28 previously described with reference to FIG. 2), and power source (not shown, but similar to the power source 30 previously described with reference to FIG. 2). As with previous embodiments, the case 372 has a first face 376 defining a viewing region 378 through which a display screen (not shown) provided by the display system 374 can be viewed. Though not shown in the view of FIG. 11A, the first face 376 further carries one or more microphones. In addition, the case defines a first side 380 at which a view screen 382 can be viewed by a user (not shown).

The view screen 382 is of an enlarged size as compared with the display screen (not shown) otherwise viewable via the viewing region 378 of the case 372. For example, the view screen 382 can be a flat panel display as known in the art. Regardless, the view screen 382 is part of the display system 374, and thus, when activated, will display images desired by the user (not shown) based upon interface with the microprocessor (not shown). With the mobile personal computer 370 of FIG. 11A, then, a user is provided with the ability to review enlarged images at the view screen 382, or reduced-sized images via the display screen when privacy is of concern (or during speech control recognition activities).

Figure 11B:
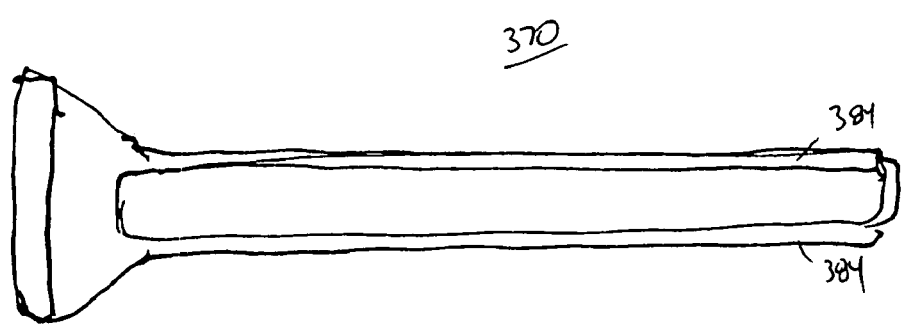
FIG. 11B is a top view of a mobile personal computer of FIG. 11A.

In addition or alternatively, the mobile personal computer 370 can be adapted to simultaneously display, and act upon, different images at the viewing region 378 (e.g., private information) and the view screen 382 (e.g., information for which privacy is of less concern). A variety of differing applications can be assigned to the displays associated with the viewing region 378 and the view screen 382. With additional reference to FIG. 11B, the mobile personal computer 370 has a tablet-like form, and is thus relative thin while still providing the enlarged view screen 382 (FIG. 11A). FIG. 11B further illustrates an alternative embodiment in which a drawer (not shown) can be selectively inserted between two legs 384 of the case or housing 372.

Figure 12A:
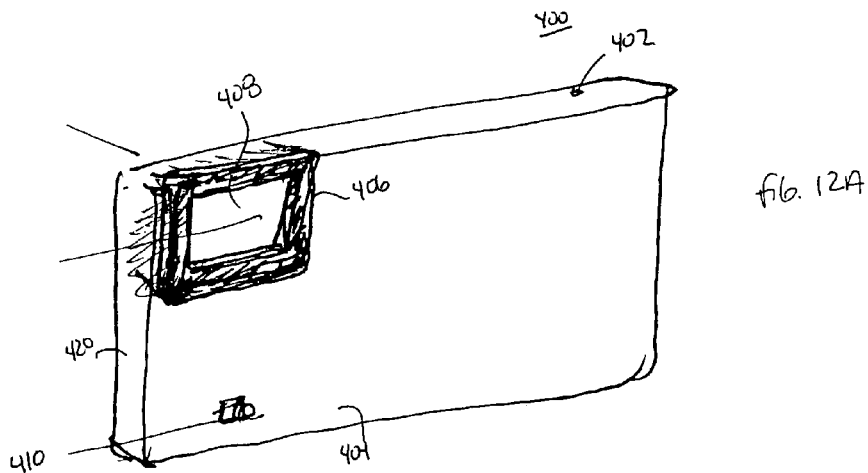
FIG. 12A is a perspective view of an alternative embodiment mobile personal computer in accordance with the present invention.

Yet another alternative embodiment mobile personal computer 400 is shown in FIG. 12A. The mobile personal computer 400 is highly similar in many respects to the mobile personal computer 20 (FIGS. 1 and 2) previously described, and includes a case 402 having a first face 404 defining a viewing region 406 at which a display screen 408 (referenced generally) can be viewed and maintaining a microphone 410. As compared to the case 22 of FIG. 1, the case 402 has a more flattened configuration. Other components of the mobile personal computer 400, such as a microprocessor and power supply, are not visible in the view of FIG. 12A, but are similar to corresponding components previously described. In addition, and in one embodiment, the mobile personal computer 400 includes a camera (not shown), the lens (not shown) of which is "open" at a face (hidden in FIG. 12A) of the case 402 opposite the first face 404. The camera is electronically connected to the microprocessor and can be operated to capture desired image(s). Though not shown, the mobile personal computer 400 can incorporate one or more of the other auxiliary features previously described (e.g., phone, speaker, linear touch pad, etc.).

Figure 12B:
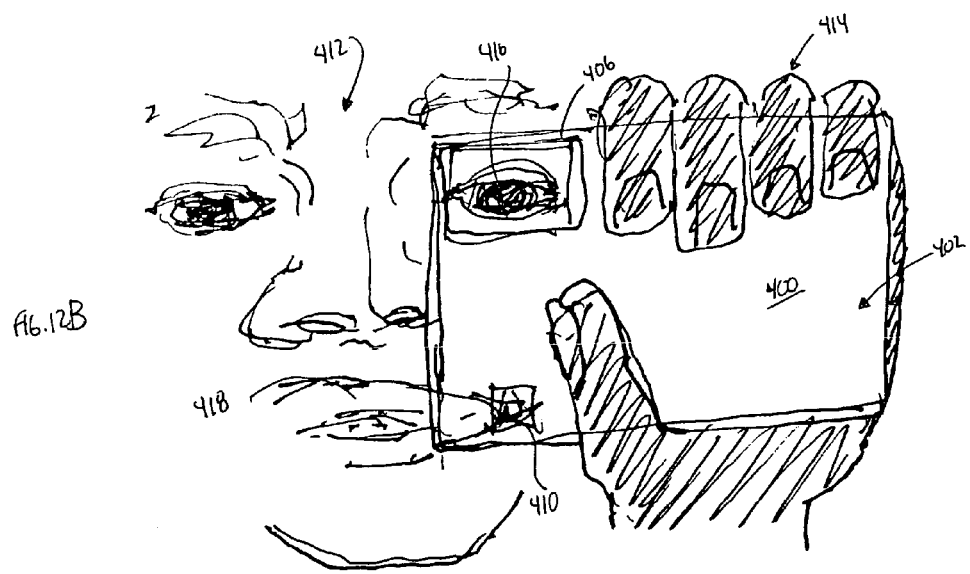
FIG. 12B schematically illustrates the mobile personal computer of FIG. 12A in use.
Figure 12C:
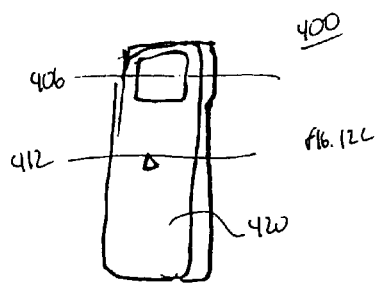
FIG. 12C is a side view of an alternative configuration of the mobile personal computer of FIG. 12A.

Use of the mobile personal computer 400 by a user 412 is illustrated in the simplified view of FIG. 12B. The case 402 is grasped in a single hand 414 of the user 412, and positioned such that the viewing region 406 is at one of the user's eyes 416, with the case 402 being configured such that the microphone 410 is, in turn, naturally positioned at or near the user's mouth 418. It will be noted that for purposes of clarification, the viewing region 406 and the microphone 410 are fully illustrated in FIG. 12B, though in actual practice, these components (as well as the user's eye 416 and mouth 418) would be "hidden" by the case 402 as the first face 404 will be "facing" the user 412. In alternative embodiments, the mobile personal computer 400 can further incorporate one or more control features (not shown), such as a touch pad(s), button(s), switch(es), etc. Even further, the mobile personal computer 400 can be configured such that the viewing region 406 and the microphone 410 are disposed on a different face 420 (also identified in FIG. 12A) of the case 402, such as with the alternative embodiment mobile personal computer 420 of FIG. 12C.

Figure 13:
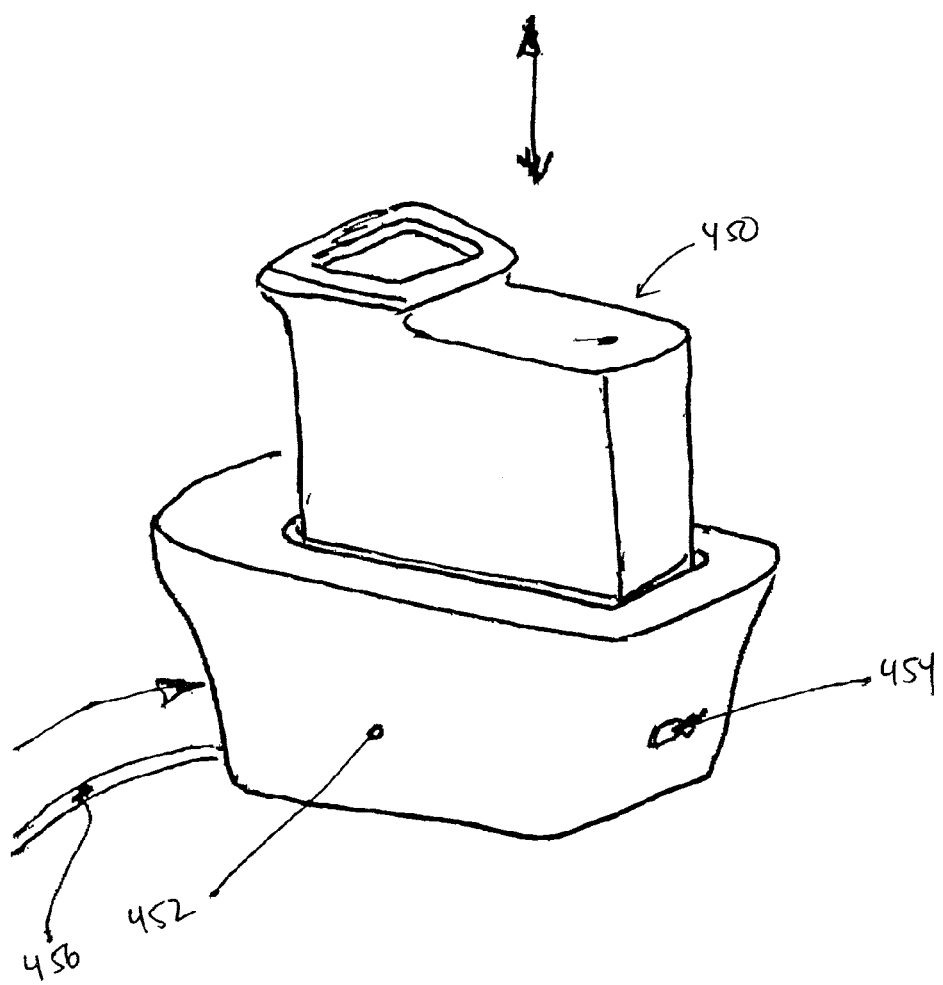
FIG. 13 is a perspective view of an alternative embodiment mobile personal computer and docking station in accordance with the present invention.

FIG. 13 illustrates another alternative embodiment mobile personal computer 450 mounted to a docking station 452. The mobile personal computer 450 can assume any of the configurations previously described. The docking station 452 can be adapted to perform a variety of functions relative to the mobile personal computer 450 similar to known laptop computer docking stations, and includes, in one embodiment, an on/off light 454 and a power cord 456. In one embodiment, the mobile/personal computer 450/docking station 452 are adapted such that the docking station 452 provides a secondary lighting source for projecting a display from the viewing region 458 onto a separate screen (not shown).

Figure 14A:
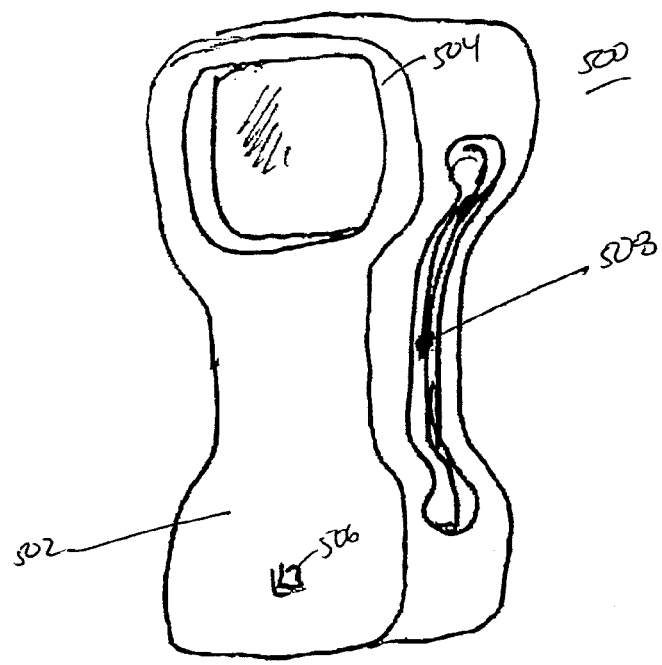
FIG. 14A is a front, perspective view of an alternative embodiment mobile personal computer in accordance with the present invention.
Figure 14B:
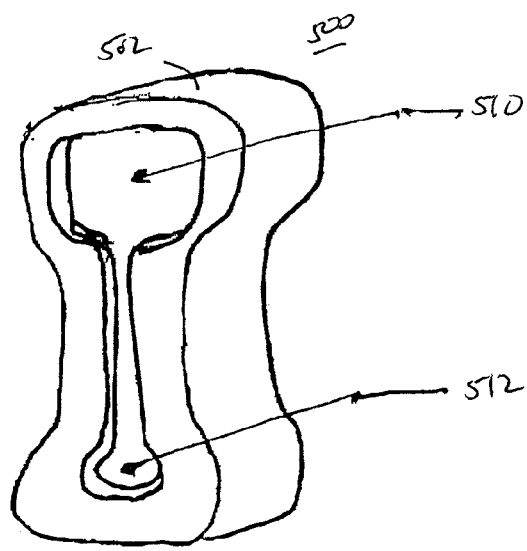
FIG. 14B is a rear, perspective view of the mobile personal computer of FIG. 14A.

FIG. 14A illustrates yet another alternative embodiment mobile personal computer 500 including a case 502, a viewing region 504, a microphone 506, and a side touch pad 508. Other components associated with the computer 20 (FIGS. 1 and 2) are further employed, but not shown. The case 502 is highly streamlined, sized for handling between a user's thumb (not shown) and finger(s) (not shown). Additionally, and as shown in FIG. 14B, a rear touch pad 510 is provided. The rear touch pad 510 is, in one embodiment, a linear touch pad and has a designated zone 512 for effectuating a common function (e.g., changing a program, display, or touch pad "purpose"). The side touch pad 508 can perform a function different from the rear touch pad 510.

Figure 15A:
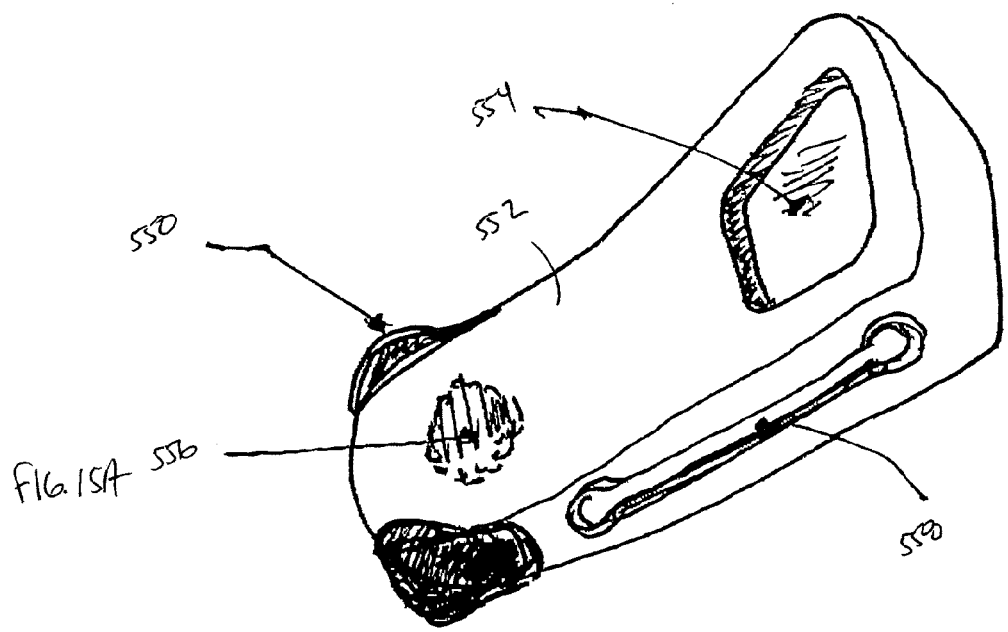
FIG. 15A is a perspective view of an alternative embodiment mobile personal computer in accordance with the present invention.
Figure 15B:
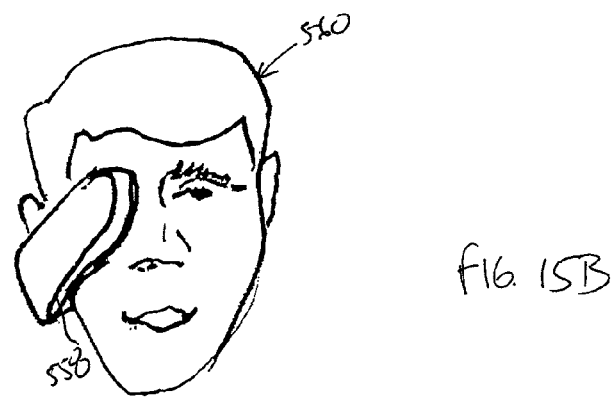
FIG. 15B is a schematic illustration of the mobile personal computer of FIG. 15A worn by a user.

Yet another alternative embodiment mobile personal computer 550 is shown in FIGS. 15A and 15B. The computer 550 is similar to previous embodiment, and includes a case 552 mimicking the shape of a phone. The computer 550 further includes a viewing region 554 and a speaker 556. In addition, the computer 550 includes a jawbone microphone 558. The case 552 is adapted for mounting to a user 560 as shown in FIG. 15B such that the jawbone microphone 558 senses or "picks-up" vibrations at the user's jaw 562 indicative of speech.

The mobile personal computer of the present invention provides a marked improvement over previous designs. The mobile personal computer is a single-handed shaped/sized device providing the most appropriate means for a mobile user to view a large (effective) display while at the same time facilitating optimal speech input means. The need for separate wires, head mounted displays, audio input/output, keyboard(s), mouse, etc., is reduced or eliminated.

Although the present invention has been described with reference to preferred embodiments, workers skilled in the art will recognize that changes can be made in form and detail without departing from the spirit and scope of the present invention.

The invention claimed is:

1. A mobile personal computer comprising:
    a case sized for handling by a single, adult human hand, the case including a drawer removably received within a housing;
    a display system maintained by the case for displaying an image relative to a first face of the case;
    a speech recognition system maintained by the case and including a microphone for collecting sound waves generated by a user's speech;
    a microprocessor maintained within the case and electronically connected to the display system and the speech recognition system, the microprocessor utilizing a personal computer operating system to perform computing operations;
    a sub-system module adapted to provide an operational feature in conjunction with the microprocessor, the sub-system module removably maintained by the drawer; and
    a power source maintained within the case.

2. The mobile personal computer of claim 1, wherein the microprocessor is adapted to execute a verbal command of a user received by the microphone.

3. The mobile personal computer of claim 1, wherein the mobile personal computer is adapted to perform language translation for words acoustically collected by the microphone.

4. The mobile personal computer of claim 1, wherein the display system includes a micro-display screen.

5. The mobile personal computer of claim 1, wherein the display system further includes:
 a screen viewable at the first face of the case; and
 a lens adjacent the screen such that a user facing the front face of the case views display on the display screen through the lens.

6. The mobile personal computer of claim 1, wherein a position of the microphone relative to the display system is based upon a human factor standard.

7. The mobile personal computer of claim 1, wherein the drawer is slidably received within the housing.

8. The mobile personal computer of claim 1, further comprising:
 at least one motion sensor electrically connected to the microprocessor;
 wherein the microprocessor. is adapted to transition from a first operational mode to a second operational mode upon receiving information from the motion sensor indicative of the case being moved in a predetermined fashion.

9. The mobile personal computer of claim 1, wherein the case is a tubular extrusion.

10. The mobile personal computer of claim 1, wherein the case further defines a second face, the mobile personal computer further comprising:
 a touch pad disposed on the second face and electrically connected to the microprocessor.

11. The mobile personal computer of claim 7, further comprising:
 a first electrical coupler and a second electrical coupler maintained by the case;
 a first indicia on an exterior of the drawer at a location corresponding with the first electrical coupler; and
 a second indicia on an exterior of the drawer at a location corresponding with the second electrical coupler, the second indicia being different from the first indicia;
 wherein the first indicia correlates with the first operational feature and the second indicia correlates with the second operational feature.

12. The mobile personal computer of claim 7, wherein the housing includes a tube extending from the first face, and further wherein the drawer is sized to nest within the tube.

13. The mobile personal computer of claim 10, wherein the touch pad is positioned such that when the case is held in a palm of a user's hand with the first face facing the user, a finger of the user's hand contacts the touch pad.

14. The mobile personal computer of claim 10, wherein the touch pad is a linear touch pad.

15. The mobile personal computer of claim 11, wherein the first indicia is further on an exterior of a frame of the first sub-system module, and the second indicia is further on an exterior of a frame of the second sub-system module.

16. The mobile personal computer of claim 12, wherein the drawer defines a second face of the case opposite the first face upon insertion into the housing.

17. The mobile personal computer of claim 1, wherein the sub-system module is a first sub-system module adapted to provide a first operational feature in conjunction with the microprocessor, the mobile personal computer further comprising:
 a second sub-system module adapted to provide a second operational feature in conjunction with the microprocessor;
 wherein the first and second sub-system modules are separately and removably secured within the case and electronically coupled to the microprocessor.

18. The mobile personal computer of claim 17, wherein the first and second sub-system modules each include a frame and an electronic connector for facilitating connection to the microprocessor.

19. The mobile personal computer of claim 18, wherein the case and respective frames are configured such that the first and second sub-system modules can be independently inserted into and removed from the case.

20. The mobile personal computer of claim 18, further comprising:
 a first electrical coupler maintained within the case for electronically connecting the first sub-system module to the microprocessor; and
 a second electrical coupler maintained within the case for electronically connecting the second sub-system module to the microprocessor.

21. The mobile personal computer of claim 20, wherein the mobile personal computer is adapted such that the first sub-system module can be swapped with a third sub-system module to provide an updated version of the first operational feature.

22. A mobile personal computer comprising:
 a case sized for handling by a single, adult human hand;
 a display system maintained by the case for displaying an image relative to a first face of the case;
 a speech recognition system maintained by the case and including a microphone for collecting sound waves generated by a user's speech;
 a microprocessor maintained within the case and electronically connected to the display system and the speech recognition system, the microprocessor utilizing a personal computer operating system to perform computing operations;
 first and second sub-system modules adapted to provide first and second operational features, respectively, in conjunction with the microprocessor, the sub-system modules being separately and removably secured within the case and electronically coupled to the microprocessor; and
 a power source maintained within the case;
 wherein the mobile personal computer is adapted such that the first sub-system module can be swapped with a third sub-system module to provide an updated version of the first operational feature.

* * * * *